US008320289B2

(12) United States Patent
Kurita et al.

(10) Patent No.: US 8,320,289 B2
(45) Date of Patent: Nov. 27, 2012

(54) WIRELESS COMMUNICATION SYSTEM

(75) Inventors: Masanori Kurita, Hirakata (JP); Haruhiro Kuboyama, Toyonaka (JP); Keitaro Hoshiba, Minoh (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 12/737,986

(22) PCT Filed: Dec. 18, 2009

(86) PCT No.: PCT/JP2009/071107
§ 371 (c)(1), (2), (4) Date: Mar. 7, 2011

(87) PCT Pub. No.: WO2010/071194
PCT Pub. Date: Jun. 24, 2010

(65) Prior Publication Data
US 2011/0235560 A1    Sep. 29, 2011

(30) Foreign Application Priority Data

Dec. 19, 2008 (JP) ................. 2008-323854
Jan. 19, 2009 (JP) ................. 2009-009189
Feb. 23, 2009 (JP) ................. 2009-039121

(51) Int. Cl.
*G08C 17/00* (2006.01)
(52) U.S. Cl. ................. 370/311; 370/318; 370/342
(58) Field of Classification Search .......... 370/311, 370/342
See application file for complete search history.

(56) References Cited

U.S. PATENT DOCUMENTS
2008/0151801 A1    6/2008 Mizuta

FOREIGN PATENT DOCUMENTS

| JP | 62-026941 A | 2/1987 |
| JP | 04-213229 A | 8/1992 |
| JP | 09-271083 A | 10/1997 |
| JP | 11-234751 A | 8/1999 |

(Continued)

OTHER PUBLICATIONS

International Search Report dated Jan. 19, 2010, issued for PCT/JP2009/071107.

(Continued)

*Primary Examiner* — Dang Ton
*Assistant Examiner* — Pamit Kaur
(74) *Attorney, Agent, or Firm* — Edwards Wildman Palmer LLP

(57) ABSTRACT

The wireless communication system includes a first wireless terminal (10A) and a plurality of second wireless terminals (10B). The first wireless terminal (10A) transmits a synchronization signal. The synchronization signal comprises a plurality of reference signals each including a reference data indicative of a relation between the corresponding reference signal and a reference time. The second wireless terminal (10B) includes a timer (13) configured to output an activation signal at a regular interval, a control unit (14), and a synchronization unit (15). The control unit (14) activates a wireless receiver (123) each time it receives the activation signal from the timer (13). When the wireless receiver (123) receives the synchronization signal, the synchronization unit (15) refers to the reference data obtained from the earliest reference signal and a reception time of the earliest reference signal, and determines the reference time. The synchronization unit (15) controls the timer (13) to output the activation signal after a lapse of a predetermined time from the reference time. The control unit (14) controls a wireless transmitter (122) to transmit a wireless signal during a period including a time period of receiving the activation signal from the timer (13).

9 Claims, 10 Drawing Sheets

FOREIGN PATENT DOCUMENTS

| | | |
|---|---|---|
| JP | 2008-176515 A | 7/2008 |
| JP | 2008-187294 A | 8/2008 |
| WO | WO-2006/067922 A1 | 6/2006 |

OTHER PUBLICATIONS

Office Action mailed Aug. 7, 2012, issued for the corresponding Japanese Patent Application No. 2008-323854.

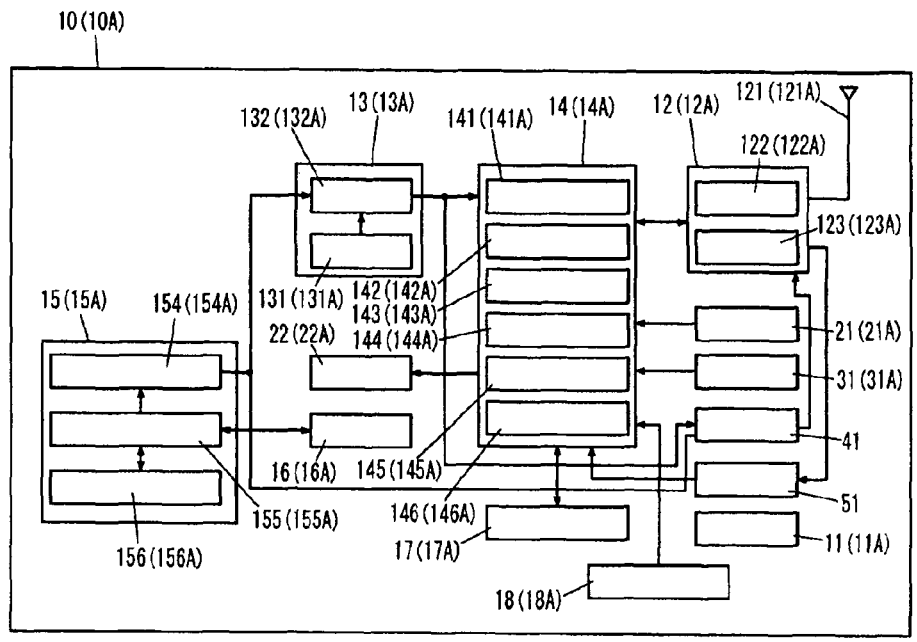
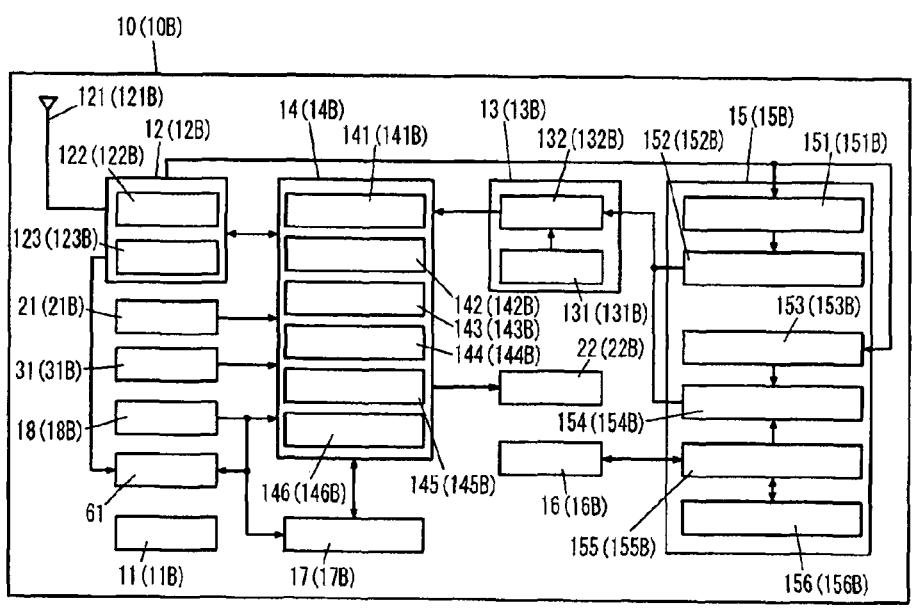
FIG. 1

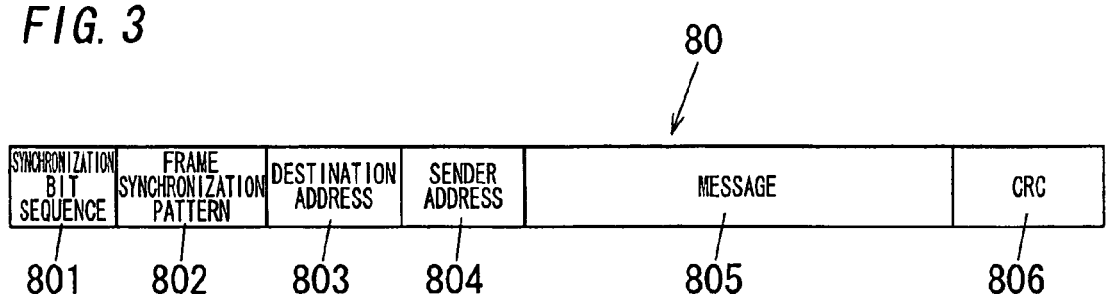
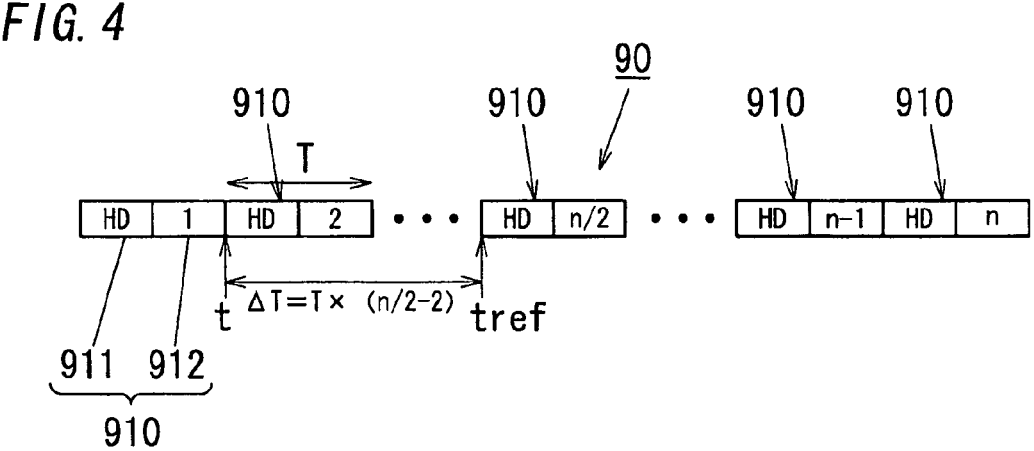
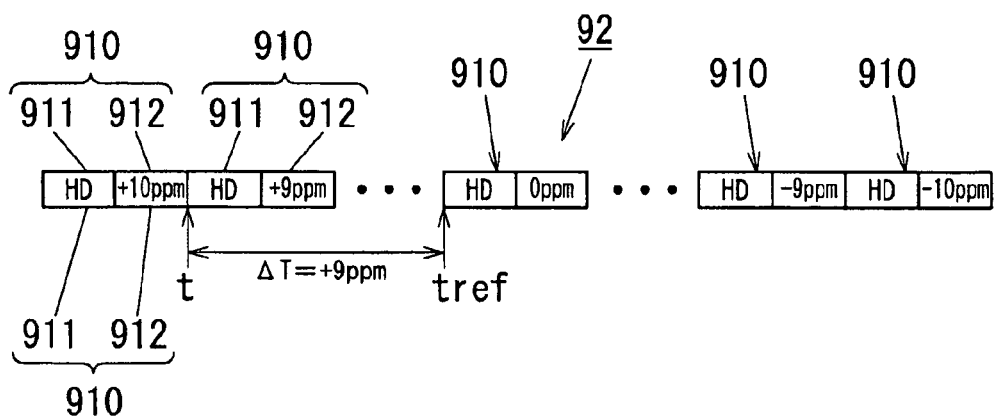

WIRELESS COMMUNICATION SYSTEM

TECHNICAL FIELD

The present invention relates to wireless communication systems including a plurality of wireless terminals, and particularly to a wireless communication system including a plurality of battery-powered wireless terminals.

BACKGROUND ART

Japanese Patent Publication Laid-Open No. 2008-176515 discloses a wireless communication system (wireless transmission system) including a plurality of battery-powered wireless terminals (wireless devices). In the wireless communication system, each of wireless terminals performs intermittent reception operation of activating its reception circuit at a predetermined intermittent reception interval. The wireless terminal checks whether or not the wireless terminal receives a desired electric wave (e.g., a wireless signal transmitted from another wireless terminal) while the reception circuit operates. When the reception circuit receives the wireless signal, the wireless terminal performs operation in response to contents of the received wireless signal. Therefore, according to the above wireless communication system, in contrast to an instance where the wireless terminal always operates its reception circuit, it is possible to reduce an amount of consumed power.

However, each of the wireless terminals performs the intermittent reception operation independently from the other wireless terminals. Thus, all of the wireless terminals destined to receive the wireless signal may fail to receive the wireless signal. When the wireless terminal failed to receive the wireless signal, the wireless terminal has no opportunity to receive the wireless signal unless the wireless signal is transmitted again.

In other words, the above wireless communication system is likely to suffer from a prolonged time for reception of the wireless signal by all the wireless terminals which are destined to receive the wireless signal.

DISCLOSURE OF INVENTION

The present invention has been accomplished in view of the above insufficiency.

The objective of the present invention is to propose a wireless communication system which is capable of reducing power consumption at wireless terminals, yet avoiding an increased time of receiving a wireless signal by all the wireless terminals which are destined to receive the wireless signal.

The wireless communication system includes a plurality of wireless terminals, and a synchronization device. Each of the wireless terminals includes a power supply unit configured to accommodate a battery therein, a wireless transmitter, a wireless receiver, a time configured to output an activating signal at a predetermined interval, a control unit, and a synchronization unit. The control unit includes an operation control module, a reception control module, and a transmission control module. The operation control module is configured to keep the reception control module operating and deactivate the transmission control module unless a predetermined event occurs, and to activate the transmission control module and deactivate the reception control module in response to occurrence of the event. The reception control module is configured to, upon receiving the activation signal from the timer, supply electrical power from the power supply unit to the wireless receiver for activation thereof, and to control the same wireless receiver in a manner to deactivate the wireless receiver unless the wireless receiver receives a predetermined wireless signal before a predetermined waiting time elapses after the wireless receiver is activated. The transmission control module is configured to supply electrical power from the power supply unit to the wireless transmitter for intermittent activation thereof, and to control the wireless transmitter in a manner to transmit an event notification signal defined as a wireless signal including a message corresponding to the event in a transmission period in which the wireless transmitter operates. The synchronization device is configured to transmit, to the plurality of the wireless terminals, a synchronization signal defined as a wireless signal announcing a reference time. The synchronization signal includes a plurality of reference signals which are arranged in a time axis. Each of the reference signals includes a reference data indicative of a relation between the corresponding reference signal and the reference time. The synchronization unit includes a reference time calculation module, and a timer control module. The reference time calculation module is configured to refer to the reference data obtained from an earliest reference signal defined as the reference signal which the wireless receiver receives primarily and a reception time at which the wireless receiver receives the earliest reference signal, when the wireless receiver receives the synchronization signal, and determine the reference time. The timer control module is configured to perform a synchronization processing of controlling the timer such that the activation signal is output after a predetermined time elapses from the reference time calculated by the reference time calculation module. The transmission control module is configured to control the wireless transmitter to transmit the event notification signal during the transmission period including a time of receiving the activation signal from the timer.

In a preferred aspect, the synchronization unit includes a reference time difference calculation module, and a correction module. The reference time difference calculation module is configured to refer to the reference data obtained from the earliest reference signal when the wireless receiver receives the synchronization signal after completion of the synchronization processing, and determine a time difference between the reference time and the reception time regarding the earliest reference signal. The correction module is configured to adjust a setting of the timer to reduce the time difference determined by the reference time difference calculation module.

In a preferred aspect, each of the wireless terminals includes a temperature sensor configured to measure a surrounding temperature thereof. The timer includes an oscillator configured to output a clock pulse at a constant interval, and a clock circuit configured to measure the predetermined interval by use of the clock pulse obtained from the oscillator and output the activation signal. The synchronization unit includes a temperature characteristics storage module, a time interval difference calculation module, and a correction module. The temperature characteristics storage module is configured to store temperature characteristics of an oscillation frequency of the oscillator. The time interval difference calculation module is configured to refer to the temperature measured by the temperature sensor and the temperature characteristics stored in the temperature characteristics storage module, and determine a time difference between the predetermined time interval at a predetermined reference temperature and the predetermined time interval at the temperature measured by the temperature sensor. The correction module is configured to adjust a setting of the timer to reduce the time difference determined by the time interval difference calculation module.

In a preferred aspect, the timer has a first time interval, and a second timer interval greater than the first time interval, and is configured to output the activation signal at the first interval before completion of the synchronization processing, and to output the activation signal at the second interval after completion of the synchronization processing.

In a preferred aspect, at least one of the plurality of the wireless terminal includes a synchronization signal transmission unit defining the synchronization device. The synchronization signal transmission unit is configured to control the wireless transmitter to transmit the synchronization signal each time it receives the activation signal from the timer by a predetermined number of times.

In a preferred aspect, the plurality of the wireless terminals includes a first wireless terminal having a judgment unit and a second wireless terminal having a notification unit. The first wireless terminal includes a synchronization signal transmission unit defining the synchronization device. The synchronization signal transmission unit is configured to control the wireless transmitter to transmit the synchronization signal each time it receives the activation signal from the timer by a predetermined number of times. The notification unit is configured to, when the wireless receiver receives the synchronization signal, control the wireless transmitter to transmit a notification signal defined as a wireless signal including a notification message. The judgment unit is configured to judge whether or not the second wireless terminal has a malfunction, on the basis of whether or not the wireless receiver receives the notification signal before a lapse of a predetermined time from transmission of the synchronization signal by the synchronization signal transmission unit.

In a preferred aspect, the synchronization signal includes a plurality of frames each of which defines the reference signal. Each of the frames includes a unique word used for synchronizing frames, and the reference data. The reference data is defined as a data indicative of a frame number exclusively assigned to the frame. The reference time difference calculation module is configured to refer to the frame number of the frame corresponding to the earliest reference signal, and determine the time difference between the reference time and the reception time regarding the earliest reference signal.

In a preferred aspect, the correction module is configured to adjust the settings of the timer when the time difference obtained from the reference time difference calculation module exceeds a minimum value of the time difference that can be varied by the timer.

In a preferred aspect, each of the wireless terminals includes a fire sensor configured to detect a fire, and an alarm generator configured to output an alarm sound. The control unit includes a fire alarm module configured to the alarm generator. The operation control module is configured to, when the fire sensor detects a fire, activate the transmission control module and deactivate the reception control module. The transmission control module is configured to, when the fire sensor detects a fire, control the wireless transmitter to transmit a fire notification signal defined as a wireless signal including a fire alarm message while the wireless transmitter operates. The fire alarm module is configured to, when the fire sensor detects a fire or when the wireless receiver receives the fire notification signal, control the alarm generator to output the alarm sound.

BRIEF DESCRIPTION OF DRAWINGS

FIG. 1 is a block diagram illustrating a wireless communication system of one embodiment in accordance with the present invention, FIG. 3 is an explanatory view illustrating a frame format of a wireless signal which each wireless terminal of the above wireless communication system transmits and receive, FIG. 4 is an explanatory view illustrating a synchronization signal used in the above wireless communication system, FIG. 5 is an explanatory view illustrating a first modification of the synchronization signal used in the above wireless communication system.

BEST MODE FOR CARRYING OUT THE INVENTION

Figure 2:
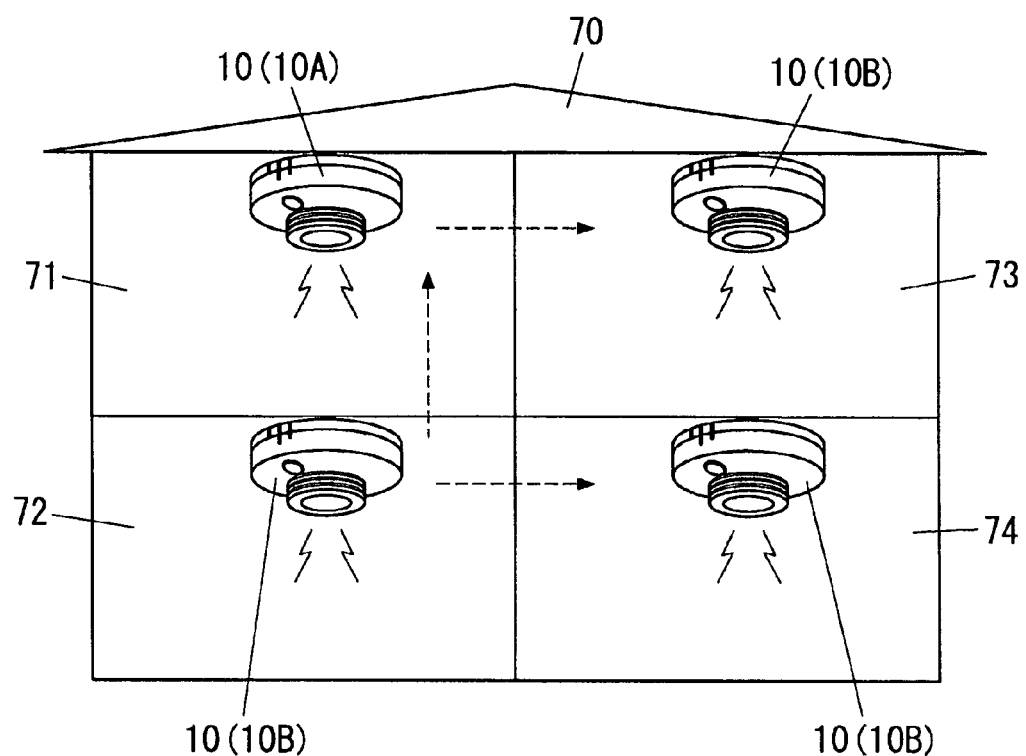
FIG. 2 is a schematic view illustrating the above wireless communication system.

As shown in FIG. 2, a wireless communication system of one embodiment of the present invention includes a plurality of wireless terminals 10. The plurality of the wireless terminals 10 includes a first wireless terminal 10 (10A) which acts as a master, and a plurality of second wireless terminals 10 (10B) each of which acts as a slave. In the following explanation, names of components belonging to the first wireless terminal 10A are mentioned to be preceded by a modifier term of "first", and reference numerals of components belonging to the first wireless terminal 10A are mentioned to be followed by a modifier term of "A". Likewise, names of components belonging to the second wireless terminal 10B are mentioned to be preceded by a modifier term of "second", and reference numerals of components belonging to the second wireless terminal 10B are mentioned to be followed by a modifier term of "B".

As shown in FIG. 1, the wireless terminal 10 includes a power supply unit 11, a wireless communication unit 12, a timer 13, a control unit 14, a synchronization unit 15 configured to perform a synchronization processing, a temperature sensor 16, a storage unit 17, and a malfunction detection unit 18.

The wireless terminal 10 is a fire alarm, and includes a fire sensor 21 configured to detect a fire, an alarm generator 22 configured to output an alarm sound, and a manipulation input device 31 defined as a user interface. Therefore, the wireless communication system of the present embodiment defines a fire alarm system.

The fire sensor 21 is configured to detect a fire. The fire sensor 21 detects a fire on the basis of smoke, heat, and/or fire which occur due to the same fire, for example. Upon detecting a fire, the fire sensor 21 notifies the control unit 14.

The alarm generator 22 is a speaker. Besides, a buzzer or the other electro-acoustic transducer may be adopted as the alarm generator 22.

The manipulation input device 31 is configured to receive a manual input for stopping the alarm sound outputted from the alarm generator 22. In the present embodiment, the manipulation input device 31 includes an alarm stop switch adapted in use to stop a fire alarm sound. The alarm stop switch is a push-button switch, for example, When the alarm stop switch is manipulated, the manipulation input device 31 outputs a manipulation signal (fire alarm stop signal) to the control unit 14.

The first wireless terminal 10A includes a synchronization signal transmission unit 41 configured to transmit a synchronization signal to the second wireless terminals 10B. In the present embodiment, the wireless terminal 10 provided with the synchronization signal transmission unit 41 defines a synchronization device. In other words, the wireless communication system of the present embodiment includes a plurality of wireless terminals (second wireless terminals 10B), and the synchronization device (first wireless terminal 10A).

The first wireless terminal 10A includes a judgment unit 51 configured to judge whether or not the second wireless terminal 10B has a malfunction. Meanwhile, each of the second wireless terminals 10B includes a notification unit 61 configured to notify the first wireless terminal 10A of its condition.

In the wireless communication system of the present embodiment, the wireless terminal 10 provided with the judgment unit 51 defines the first wireless terminal 10A, and the wireless terminal 10 provided with the notification unit 61 defines the second wireless terminal 10B.

Each of the wireless terminals 10 is installed in a residence 70, for example. In an instance illustrated in FIG. 2, the first wireless terminal 10A is installed in a bedroom. In addition, the second wireless terminals 10B are installed in a kitchen 72, a den 73, and a living room, respectively. Besides, the first wireless terminal 10A is installed to successfully transmit a wireless signal to all the second wireless terminals 10B, and to successfully receive a wireless signal from all the second wireless terminals 10B.

The power supply unit 11 is configured to supply electrical power necessary to operate the wireless terminal 10. The power supply unit 11 includes a case (not shown) configured to accommodate a battery (not shown). The power supply unit 11 uses the battery accommodated in the case as a power source for activation of the wireless terminal 10. In brief, the wireless communication system of the present embodiment comprises the battery-powered wireless terminals 10.

The storage unit 17 is configured to store identification signs assigned uniquely to the wireless terminals 10. The identification sign is used to judge which wireless terminal 10 is a destination of the wireless signal and which wireless terminal 10 is a source of the wireless signal.

The wireless communication device 12 includes an antenna 121, a wireless transmitter 122, and a wireless receiver 123. The wireless transmitter 121 is configured to transmit, by use of the antenna 121, a wireless signal using electric wave as a medium. The wireless receiver 122 is configured to receive, by use of the antenna 121, a wireless signal transmitted from the other wireless terminal 10A.

The timer 13 is configured to output, to the control unit 14, an activation signal at a predetermined time interval (intermittent reception interval). The timer 13 includes an oscillator (signal generator) 131, and a clock circuit 132. The oscillator 131 is configured to output a clock pulse (clock signal) to the clock circuit 132. The oscillator 131 is an oscillator utilizing a tuning fork crystal oscillator. Besides, the oscillator 131 may be an oscillator utilizing a crystal oscillator or a ceramic vibrator. The clock circuit 132 is configured to measure the predetermined time interval by use of the clock pulse obtained from the oscillator 131. The clock circuit 132 is configured to output the activation signal each time the predetermined time interval elapses. For example, the clock circuit 132 outputs the activation signal when the number of times the clock circuit 132 obtained the clock pulse becomes equal to a predetermined number of times corresponding to the predetermined time interval.

The temperature sensor 16 is configured to measure a surrounding temperature of the wireless terminal 10. The temperature sensor 16 measures the surrounding temperature by use of a temperature detecting element (e.g., a thermistor). The temperature sensor 16 outputs, to the synchronization unit 15, a temperature signal indicative of the measured surrounding temperature.

The malfunction detection unit 18 is configured to check, at a predetermined period (e.g., 1 hour), whether or not the wireless terminal 10 has a malfunction. The malfunction of the wireless terminal 10 is breakdown of the fire sensor 21, and run out of the battery of the power supply unit 11, for example. The first malfunction detection unit 18A is configured to notify the first control unit 14A of a result of check of the malfunction of the first wireless terminal 10A. The second malfunction detection unit 18B is configured to notify the second control unit 14B of a result of check of the malfunction of the second wireless terminal 10B, and store the same result in the second storage unit 17B.

The control unit 14 includes an operation control module 141, a reception control module 142, a transmission control module 143, a synchronization communication module 144, a fire alarm module 145, and a malfunction alarm module 146. The control unit 14 is a micro computer, for example. The control unit 14 executes programs stored in a memory (e.g., ROM, and EEPROM) not shown, thereby functioning as each of modules 141 to 146.

The operation control module 141 is configured to keep the reception control module 142 turned on and keep the transmission control module 143 turned off unless a predetermined event occurs. The operation control module 141 is configured to activate the transmission control module 143 and deactivate the reception control module 142 in response to occurrence of the event. The event is a fire, or manipulation of stopping the fire alarm, for example.

In the present embodiment, the operation control module 141 is configured to, when the fire sensor 21 detects a fire, activate the transmission control module 143 and deactivate the reception control module 142.

The transmission control module 143 is configured to supply electric power from the power supply unit 11 to the wireless transmitter 122 for intermittent activation of the wireless transmitter 122. The transmission control module 143 is configured to supply electric power from the power supply unit 11 to the wireless receiver 123 for activation of the wireless receiver 123 so long as the wireless transmitter 122 is deactivated. In brief, the transmission control module 143 activates the wireless transmitter 122 and the wireless receiver 123 alternately. Therefore, when the fire sensor 21 detects a fire, the wireless terminal 10 transmits a wireless signal during a period (transmission period) in which the wireless transmitter 122 operates, and prepares to receive a wireless signal during a period (rest period) in which the wireless receiver 123 operates.

The transmission control module 143 is configured to, during operation of the wireless transmitter 122, control the wireless transmitter 122 to transmit an event notification signal (fire notification signal) defined as a wireless signal including a message (fire alarm message) corresponding to the event. As described in the above, when the fire sensor 21 detects a fire, the transmission control module 143 controls the wireless transmitter 122 to transmit the fire notification signal during operation of the wireless transmitter 122. The transmission control module 143 repeats transmitting the fire notification signal a number of times determined by the maximum number of frames capable of being transmitted during the transmission period.

The transmission control module 143 is configured to control the wireless transmitter 122 to transmit the event notification signal (fire notification signal) during the transmission period including a time period of receiving the activation signal from the timer 13.

The operation control module 141 is configured to, upon receiving the fire alarm stop signal from the manipulation input device 31, activate the transmission control module 143 and deactivate the reception control module 142. Therefore, upon receiving the manual input for stopping the fire alarm, the wireless terminal 10 transmits a wireless signal during the transmission period, and prepares to receive a wireless signal during the rest period.

In this situation, the transmission control module 143 is configured to, during operation of the wireless transmitter 122, control the wireless transmitter 122 to transmit an event notification signal (alarm stop signal) defined as a wireless signal including a message (alarm stop message) corresponding to the event. As described in the above, when the manipulation input device 31 receives the manual input for stopping the fire alarm, the transmission control module 143 controls the wireless transmitter 122 to transmit the alarm stop signal during operation of the wireless transmitter 122. The transmission control module 143 repeats transmitting the alarm stop signal a number of times determined by the maximum number of frames capable of being transmitted during the transmission period.

Besides, the first operation control module 141A activates the transmission control module 143 and deactivates the reception control module 142 when the first wireless receiver 123A receives the fire notification signal. The first operation control module 141A controls the first transmission control module 143A to transmit the fire notification signal. Further, the first operation control module 141A activates the transmission control module 143 and deactivates the reception control module 142 when the first wireless receiver 123A receives the alarm stop signal. The first operation control module 141A controls the first transmission control module 143A to transmit the alarm stop signal.

The fire alarm module 145 is configured to, when the fire sensor 21 detects a fire, controls the alarm generator 22 to output the alarm sound (fire alarm sound) for announcing occurrence of the fire. The fire alarm sound is a buzzer sound, or an audio message, for example. Further, the fire alarm module 145 is configured to, when the wireless receiver 123 receives the fire alarm signal, controls the alarm generator 22 to output the fire alarm sound.

The fire alarm module 145 is configured to, when the manipulation input device 31 receives the manual input for stopping outputting the fire alarm sound, stop outputting the fire alarm sound. In addition, the fire alarm module 145 is configured to, when the wireless receiver 123 receives the alarm stop signal, controls the alarm generator 22 to stop outputting the fire alarm sound. The fire alarm module 145 is configured to keep the alarm generator 22 outputting the fire alarm sound even if the wireless receiver 123 receives the alarm stop signal so long as the fire sensor 21 detects a fire.

The second fire alarm module 145B checks a condition of the second alarm generator 22B each time the second wireless receiver 123B receives the fire alarm message. When the second alarm generator 22B does not outputs the fire alarm sound, the second fire alarm module 145B controls the second alarm generator 22B to output the fire alarm sound.

As mentioned in the above, the control unit 14 controls the alarm generator 22 to output the fire alarm sound when the fire sensor 21 detects a fire. In addition, the control unit 14 activates the wireless transmitter 122 before the timer 13 completes counting the intermittent reception interval (before receiving the activation signal from the timer 13). The control unit 14 controls the wireless transmitter 122 to transmit the fire notification signal to all the other wireless terminals 10 during the transmission period including a point of time at which the count of the intermittent reception interval is completed (at which the activation signal is received).

FIG. 3 shows a format of a frame 80 of a wireless signal which the wireless transmitter 122 transmits. The frame 80 comprises a synchronization bit sequence (preamble) 801, a frame synchronization pattern (unique word) 802, a destination address 803, a sender (source) address 804, a message 805, and a CRC code 806. Besides, the destination address 803 may be a broadcast address (multicast address) defined as a specific bit sequence (e.g., a bit sequence in which all bits are 1) which is not assigned to any wireless terminals 10. For example, the broadcast address is used as the destination address 803 of the fire notification signal.

The reception control module 142 is configured to, upon receiving the activation signal from the timer 13, supply electrical power from the power supply unit 11 to the wireless receiver 123 for activation thereof. The reception control module 142 is configured to, after activating the wireless receiver 123, perform judgment of whether or not the wireless receiver 123 receives a predetermined wireless signal (wireless signal which another wireless terminal 10 transmits). The judgment is made by use of check of reception of electric waves. The reception control module 142 performs the check of reception of electric waves on the basis of a receiving signal strength indication signal outputted from the wireless receiver 123. The receiving signal strength indication signal is a DC voltage signal having its magnitude proportional to receiving signal strength of a wireless signal which the wireless receiver 123 received. The reception control module 142 determines that the predetermined wireless signal was received, when the receiving signal strength indicated by the receiving signal strength indication signal exceeds a predetermined threshold. In this situation, the reception control module 142 keeps the wireless receiver 122 operating until all of the predetermined wireless signals are received. In addition, the reception control module 142 is configured to control the wireless receiver 123 in a manner to deactivate the same wireless receiver 123 unless the wireless receiver 122 receives the predetermined wireless signal before a lapse of a predetermined waiting period from activation of the wireless receiver 122.

As described in the above, the wireless terminal 10 prepares to receive a wireless signal at the predetermined intermittent reception interval so long as the reception control module 142 operates.

The notification unit 61 is configured to, when the second wireless receiver 123B receives the synchronization signal, controls the second wireless transmitter 122B to transmit a notification signal defined as a wireless signal including a notification message. The notification message is defined as a message indicative of the result of check of the malfunction of the second wireless terminal 10B stored in the second storage unit 17B.

The judgment unit 51 deactivates the first wireless transmitter 122A and activates the first wireless receiver 123A after the synchronization signal transmits the synchronization signal. The judgment unit 51 determines that the second wireless terminal 10B has the malfunction when the first receiver 123A fails to receive the notification signal before a lapse of a predetermined time after the synchronization signal transmission unit 41 transmits the synchronization signal. In brief, the judgment unit 51 is configured to judge whether or not the second wireless terminal 10B has the malfunction, on the basis of whether or not the first wireless receiver 123A receives the notification signal before a lapse of the predetermined time from transmission of the synchronization signal by the synchronization signal transmission unit 41. Additionally, the judgment unit 51 determines that the second wireless terminal 10B has the malfunction when the notification message included in the notification signal received by the first receiver 123A indicates the malfunction of the second wireless terminal 10B.

The malfunction alarm module 146 is configured to, when the malfunction detection unit 18 detect the malfunction of the wireless terminal 10, control the malfunction alarm generator 22 to output an alarm sound (malfunction alarm sound) for announcing the malfunction of the wireless terminal 10. The malfunction alarm sound is a buzzer sound, or an audio message, for example. Notably, the first malfunction alarm module 146A is configured to, when the judgment unit 51 determines that the second wireless terminal 10B has the malfunction, control the first alarm generator 22A to output the malfunction alarm sound. The malfunction alarm module 146 is configured to, when the manipulation input device 31 receives the manual input for stopping outputting the malfunction alarm sound, stop outputting the malfunction alarm sound.

The synchronization signal transmission unit 41 is configured to control the first wireless transmitter 122A to transmit, the synchronization signal defined as a wireless signal announcing a reference time, to a plurality (all) of the second wireless terminals 10B. The synchronization signal transmission unit 41 is configured to control the first wireless transmitter 122A to transmit the synchronization signal each time it receives the activation signal from the first timer 13A by a predetermined number of times (e.g., the number of times corresponding to 1 hour).

The synchronization signal comprises a plurality of reference signals arranged in a time axis. Each of the reference signals includes a reference data indicative of a relation between itself and the reference time.

The synchronization signal transmission unit 41 of the present embodiment is configured to transmit the synchronization signal 91 shown in FIG. 4. The synchronization signal 91 shown in FIG. 4 includes a plurality of frames 910 each defining a reference signal.

Each of the frames 910 includes a header 911, and a data field 912 indicative of a reference data. The header 911 includes a unique word for frame synchronization. Besides, the header 911 further includes the destination address and the sender (source) address, for example. The reference data indicates a frame number assigned to the corresponding frame. The different frame numbers are assigned to the different frames. For example, when the number of the reference signal is n (n is positive integer), the frame number "1" is assigned to a foremost frame of the synchronization signal 91, and the frame number "n" is assigned to a rearmost frame of the synchronization signal 91. In this situation, the frame number is defined as a successive transmission number indicative of an order of frames transmitted to the second wireless terminal 10B.

The synchronization signal transmission unit 41 transmits the synchronization signal at a predetermined period. The predetermined period is selected such that a maximum time difference between the points of time at which the timers 13 of the wireless terminals 10 output the activation signals does not exceed a transmission period of the synchronization signal.

In order to synchronize the second wireless terminals 10B first, the synchronization signal transmission unit 41 transmits the synchronization signal two times at a predetermined time interval. Therefore, each frame number of the first synchronization signal and the second synchronization signal includes information indicative of distinction of the first synchronization signal and the second synchronization signal. For example, the frame number "1-n" is assigned to frames of the first synchronization signal, and the frame number "2-n" is assigned to frames of the second synchronization signal. Thus, when transmitting the synchronization signal two times, all of the second wireless terminals 10B can receive the synchronization signal.

The synchronization signal transmission unit 41 transmits the synchronization signal one time in order to synchronize the second wireless terminals 10B after the second wireless terminals 10B are synchronized once.

FIG. 5 shows the synchronization signal 92 according to a first modification. In this synchronization signal 92, the reference data is defined as a data indicative of a time deviation from the reference time. For example, the reference data indicates a time difference (e.g., 0 ppm, ±1 ppm, ..., ±10 ppm) between the corresponding reference signal and the reference signal corresponding to the reference time.

Figure 6:
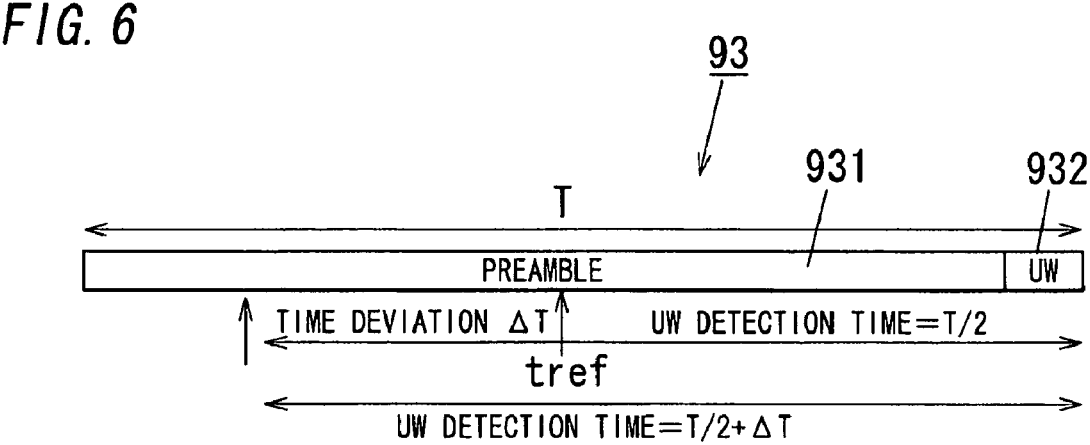
FIG. 6 is an explanatory view illustrating a second modification of the synchronization signal used in the above wireless communication system.

FIG. 6 shows the synchronization signal 93 according to a second modification. The synchronization signal 93 has a frame construction including a preamble 931 and a unique word 932.

The second synchronization unit 15B includes a reference time calculation module 151, a timer control module 152 configured to perform a synchronization processing, a reference time difference calculation module 153, a correction module 154 configured to perform a first correction processing and a second correction processing, a temperature characteristics storage module 155, and a time interval difference calculation module 156. The synchronization unit 15 is a microcomputer, for example. The synchronization unit 15 executes programs stored in a memory (e.g., ROM, and EEPROM) not shown, thereby functioning as each of modules 151 to 156. Besides, a single microcomputer may be configured to act as both the synchronization unit 15 and the control unit 14.

The reference time calculation module 151 is configured to refer to the reference data obtained from the earliest reference signal 910 defined as the reference signal 910 which the wireless receiver 123 receives first, and a reception time (reception start time) defined as a time at which the wireless receiver 123 receives the earliest reference signal 910, when the wireless receiver 123 receives the synchronization signal 91, and determine the reference time. For example, it is assumed that the reference signal 910 which includes the reference data (frame number) indicates n/2 is corresponding to the reference time, and that a time width (time length) of the reference signal 910 is T (sec). In this situation, when the earliest reference signal 910 includes the reference data indicative of i, a time difference $\Delta T$ between the reception start time t and the reference time tref is represented by a formula of $T*(n/2-i)$, as shown in FIG. 4. Now, the reference time tref is represented by a formula of $t+\Delta T$. For example, when n=10, and i=2, the reference time tref is equal to $t+3T$.

When ΔT has a positive sign, the reception start time t is prior to the reference time tref. When ΔT has a negative sign, the reception start time t is subsequent to the reference time tref. Alternatively, when the reference signal 910 which includes the reference data indicative of "1" is corresponding to the reference time, the time difference ΔT between the reception start time t and the reference time tref is represented by a formula of T*(1−i).

As described in the above, the reference time difference calculation module 151 is configured to refer to the frame number of the frame corresponding to the earliest reference signal 910 and the reception time (reception start time) of the earliest reference signal, and determine the reference time tref.

In an instance of the synchronization signal 92 according to the first modification, each of the reference signals 910 has a reference data indicates a time difference between itself and the reference signal corresponding to the reference time, that is, a time difference ΔT between the reception start time t and the reference time tref. Therefore, the reference time calculation module 151 refers to the reference data (=ΔT) of the earliest reference signal 910 and the reception start time (t), and determines the reference time tref.

In an instance of the synchronization signal 93 according to the second modification, the reference time calculation module 151 measures a time (UW detection time) Tuw which starts at a point of time t0 of starting reception of the preamble 931 of the synchronization signal 93 and ends at a point of time t1 of completing reception of the unique word 932. For example, when a time width of the synchronization signal 93 is T (sec) and a middle (=T/2) of the synchronization signal 93 defines a reference point (i.e., reference time) for detection of a time deviation, the time difference ΔT is represented by a formula of Tuw−T/2. In brief, the reference time calculation module 151 determines the time difference ΔT on the basis of a time interval between a point of time of starting reception of the synchronization signal 93 and a point of time of completing reception of the same synchronization signal 93.

The timer control module 152 is configured to perform the synchronization processing of controlling the timer 13 such that the activation signal is output after a predetermined time TW elapses from the reference time tref calculated by the reference time calculation module. The predetermined time TW is selected such that the activation signal is output after all the wireless terminal 10 completes receiving the synchronization signal. Further, the timer control module 152 increases the intermittent reception interval of the time 13 after the synchronization processing is executed. Provided that the intermittent reception interval relied before the execution of the synchronization processing is defined as a first time interval and the intermittent reception interval relied after the execution of the synchronization processing is defined as a second time interval, the second interval is greater than the first interval. In other words, the timer 13 has the first time interval, and the second time interval which is greater than the first time interval. The clock circuit 132 is configured to output the activation signal at the first time interval before completion of the synchronization processing, and to output the activation signal at the second time interval after completion of the synchronization processing.

The reference time difference calculation module 153 is configured to refer to the reference data obtained from the earliest reference signal when the wireless receiver 123 receives the synchronization signal after completion of the synchronization processing, and determine the time difference ΔT between the reference time tref and the reception time (reception start time) t regarding the earliest reference signal. In the present embodiment, the reference time difference calculation module 153 is configured to refer to the frame number of the frame corresponding to the earliest reference signal 910, and determine the time difference ΔT between the reference time tref and the reception time (reception start time) t regarding the earliest reference signal. A method for determining the time difference ΔT is explained in the above, and no explanation thereof is deemed necessary.

Figure 7:
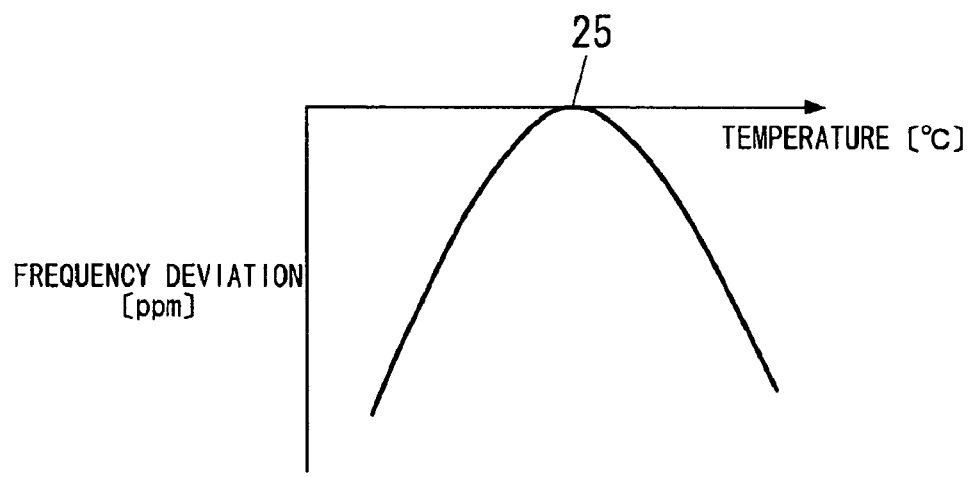
FIG. 7 is a diagram illustrating frequency-temperature characteristics of an oscillator used in the above wireless communication system.

The temperature characteristics storage module 156 is configured to store temperature characteristics of an oscillation frequency of the oscillator 131 of the timer 13. In the present embodiment, the oscillator 131 is an oscillator utilizing a tuning fork crystal oscillator. As shown in FIG. 7, the oscillator utilizing a tuning fork crystal oscillator has temperature characteristics of an oscillation frequency of increasing a frequency deviation with an increase of a temperature difference between surrounding temperature and room temperature (e.g., 25° C.).

The time interval difference calculation module 155 is configured to determine a time deviation of the intermittent reception time interval caused by a change in temperature. The time deviation is defined as a time difference (time interval difference) between the intermittent reception interval (reference time interval) at a predetermined reference temperature and the intermittent reception interval (measured time interval) at the surrounding temperature (measured temperature) measured by the temperature sensor 16. The reference temperature is a room temperature (25° C., in the present embodiment). Besides, the reference temperature may be a temperature measured when the correction module 154 performs the first correction processing.

The time interval difference calculation module 155 refers to the temperature characteristics stored in the temperature characteristics storage module 156, and determines the frequency deviation of the oscillator 131 due to the temperature difference between the measured temperature and the reference temperature. The time interval difference calculation module 155 calculates the time interval difference from the determined frequency deviation.

As described in the above, the time interval difference calculation module 155 is configured to refer to the measured temperature and the temperature characteristics stored in the temperature characteristics storage module 156, and determine the time interval difference. The time interval difference calculation module 155 is configured to determine the time interval difference at a predetermined cycle (e.g., a few minutes to tens of minutes). Besides, the time interval difference calculation module 155 may be configured to determine the time interval difference when the temperature difference between the reference temperature and the measured temperature becomes not less than a predetermined value (e.g., a few ° C. to tens of ° C.), and control the correction module 154 to perform the second correction processing.

The correction module 154 is configured to adjust a setting of the timer 13 so as to reduce the time difference ΔT determined by the reference time difference calculation module 153 in the first correction processing. For example, the correction module 154 performs fine adjustment of the intermittent reception interval of the timer 13 corresponding to magnitude of the time difference ΔT, thereby reducing the time difference ΔT. In other words, the correction module 154 increases or decreases the predetermined number of times of the clock circuit 132 to reduce the time difference ΔT.

The correction module 154 is configured to adjust the setting of the timer 13 so as to reduce the time interval difference determined by the time interval difference calculation module 155 in the second correction processing. For example, the correction module 154 performs fine adjustment of the intermittent reception interval of the timer 13 so as to eliminate the time interval difference. In other words, the correction module 154 increases or decreases the predetermined number of times of the clock circuit 132 to reduce the time interval difference.

It is assumed that the tuning fork crystal oscillator oscillates at 32.768 kHz. In this situation, when the intermittent reception interval is 5 s, the predetermined number of times is equal to 163840 (=32.768 kHz*5 s). The intermittent reception interval is varied by 6 ppm (=1/163840) as the predetermined number of times (count value of the clock circuit 132) is incremented by one. In brief, the intermittent reception interval has a minimum value $\Delta Tmin$ which varies through adjustment of the settings of the timer 13. $\Delta Tmin$ is a minimum value unit by which the intermittent reception interval is corrected.

The correction module 154 is configured to, when the time difference $\Delta T$ obtained from the reference time difference calculation module 153 becomes not less than the minimum value $\Delta Tmin$, adjust the setting of the timer 13. For example, the correction module 154 increases or decreases the predetermined number of times every 10 minutes to reduce the time difference $\Delta T$.

Additionally, the correction module 154 is configured to increase or decrease the predetermined number of times before the accumulated time difference $\Delta T$ exceeds a predetermined upper limit. The predetermined upper limit is defined as a time (value slightly smaller than a half of the time width of the synchronization signal) enough to receive the synchronization signal, for example.

Likewise, the correction module 154 is configured to, when the time interval difference obtained from the reference time difference calculation module 155 becomes not less than the minimum value $\Delta Tmin$, adjust the settings of the timer 13. Further, the correction module 154 is configured to increase or decrease the predetermined number of times before the accumulated time difference $\Delta T$ exceeds a predetermined upper limit. The predetermined upper limit is defined as a time (value slightly smaller than a half of the time width of the synchronization signal) enough to receive the synchronization signal, for example.

The first synchronization unit 15A includes the correction module 154, the temperature characteristics storage module 155, and the time interval difference calculation module 156.

The synchronization signal transmission unit 41 is configured to perform the synchronization processing of controlling the timer 13 to output the activation signal after the predetermined time Tw elapses from the reference time tref, in a similar manner as the timer control module 152. Needless to say, since the synchronization signal transmission unit 41 controls the wireless transmitter 122 to transmit the synchronization signal, the synchronization signal transmission unit 41 knows the reference time tref.

Further, the synchronization signal transmission unit 41 increases the intermittent reception interval after completion of the synchronization processing. Therefore, the first clock circuit 132A is configured to output the activation signal at the first time interval before completion of the synchronization processing, and to output the activation signal at the second time interval after completion of the synchronization processing.

The first operation control module 141A activates and controls the first transmission control module 143A to transmit the fire notification signal when the first fire sensor 21A detects a fire. In this situation, the destination of the fire notification signal transmitted by the first transmission control module 143A designates all the second wireless terminals 10B.

In contrast, when the first wireless receiver 123A receives the fire notification signal, the first operation control module 141A activates and controls the first transmission control module 143A to transmit the fire notification signal. In this situation, the destination of the fire notification signal transmitted by the first transmission control module 143A designates the second wireless terminals 10B with the exception of the second wireless terminals 10B which transmit the fire notification signal received by the first wireless receiver 123A. Besides, the destination of the fire notification signal designates all the second wireless terminals 10B.

The second operation control module 141B is configured to, when the second wireless receiver 123B receives the fire notification signal, control the second wireless transmitter 122B to transmit an acknowledgment signal. The acknowledgment signal is defined as a wireless signal which includes an acknowledge message indicative of reception of the fire alarm message.

As described in the above, according to the wireless communication system of the present embodiment, when the fire sensor 21 of any one of the wireless terminals 10 detects a fire, the alarm generators 22 of all the wireless terminals 10 output the fire alarm sounds. In other words, the wireless communication system performs fire alarm cooperation.

The first wireless terminal 10A is configured to establish a TDMA (time division multiple access) wireless communication (hereinafter, referred to as "synchronization communication") with the plural second wireless terminals 10B. This synchronization communication is made by the first synchronization communication module 144A in association with the second synchronization communication modules 144B. With a situation where the first wireless terminal 10A establishes the synchronization communication with the plural second wireless terminals 10B, it is possible to successfully prevent collision of wireless signals transmitted from the plural second wireless terminals 10B.

The first operation control module 141A is configured to, when the first transmission control module 142A receives the acknowledgement signals from all of the second wireless terminals 10B which the first transmission control module 142A transmits the fire notification signal to, activate the first synchronization communication module 144A.

The first synchronization communication module 144A is configured to control the first wireless transmitter 122A to transmit a synchronization beacon at a constant cycle. The synchronization beacon is a signal which defines time slots necessary to establish the above synchronization communication. The plural time slots are includes in one period (cycle) of the synchronization signal. In the present embodiment, the time slots are respectively assigned to the plural second wireless terminals 10B.

The first synchronization communication module 144A is configured to enclose a message from the wireless terminal 10A to the second wireless terminal 10B in the synchronization beacon and transmit the resultant synchronization beacon.

For example, the first synchronization communication module 144A transmits the fire alarm message to each of the second wireless terminals 10B at a constant period by enclosing the fire alarm message in the synchronization beacon. With enclosing the fire alarm message in the synchronization beacon, each of the second wireless terminals 10B can successfully output fire alarm sounds. Accordingly, all the wireless terminals 10 output the fire alarm sounds when a fire occurs, thereby increasing a user's chance of hearing the fire alarm sound with an attendant improvement of safety.

Besides, assignment of the time slots to the second wireless terminals 10B may be stable. Information indicative of the assignment of the time slots may be announced to each of the second wireless terminals 10B by use of the synchronization beacon.

The second synchronization communication module 144B is configured to, when the second wireless receiver 123B receives the synchronization beacon, store a data destined to be transmitted to the first wireless terminal 10A in the assigned time slot. In brief, a wireless signal including a message from the second wireless terminal 10B to the first wireless terminal 10A is included in the time slot assigned to the same second wireless terminal 10B and is transmitted. Upon receiving the fire alarm message by means of the synchronization beacon, the second synchronization communication module 144B transmits a message indicative of a fire detection condition (which indicates whether or not the fire sensor 21 detects a fire) by use of the time slot.

The first fire alarm module 145A stores the fire detection condition of each wireless terminal 10 in the first storage unit 17A. The first fire alarm module 145A updates the fire detection condition of each wireless terminal 10 stored in the first storage unit 17A as needed (e.g., each time the fire detection condition is received from the wireless terminal 10).

The wireless communication system of the present embodiment has operation conditions, that is, a waiting condition, an alarm cooperation condition (fire alarm cooperation condition), and a cooperation stop condition. The waiting condition is defined as a condition where no fire sensors 21 of the wireless terminals 10 detect a fire. The alarm cooperation condition is defined as a condition where all the wireless terminals 10 output the fire alarm sounds. The cooperation stop condition is defined as a condition where only the wireless terminal 10 which is detecting a fire, that is, the fire origin wireless terminal 10 outputs the fire alarm sound. In brief, in the cooperation stop condition, the wireless terminals 10 other than the fire origin wireless terminal 10 do not output the fire alarm sounds.

Next, an explanation is made to operation of the wireless communication system, referring to FIGS. 8 to 13. Besides, in the following explanation, a reference numeral MS designates the first wireless terminal 10A and reference numerals FT1 to FT3 designate the different second wireless terminals 10B, as necessary.

Figure 8:
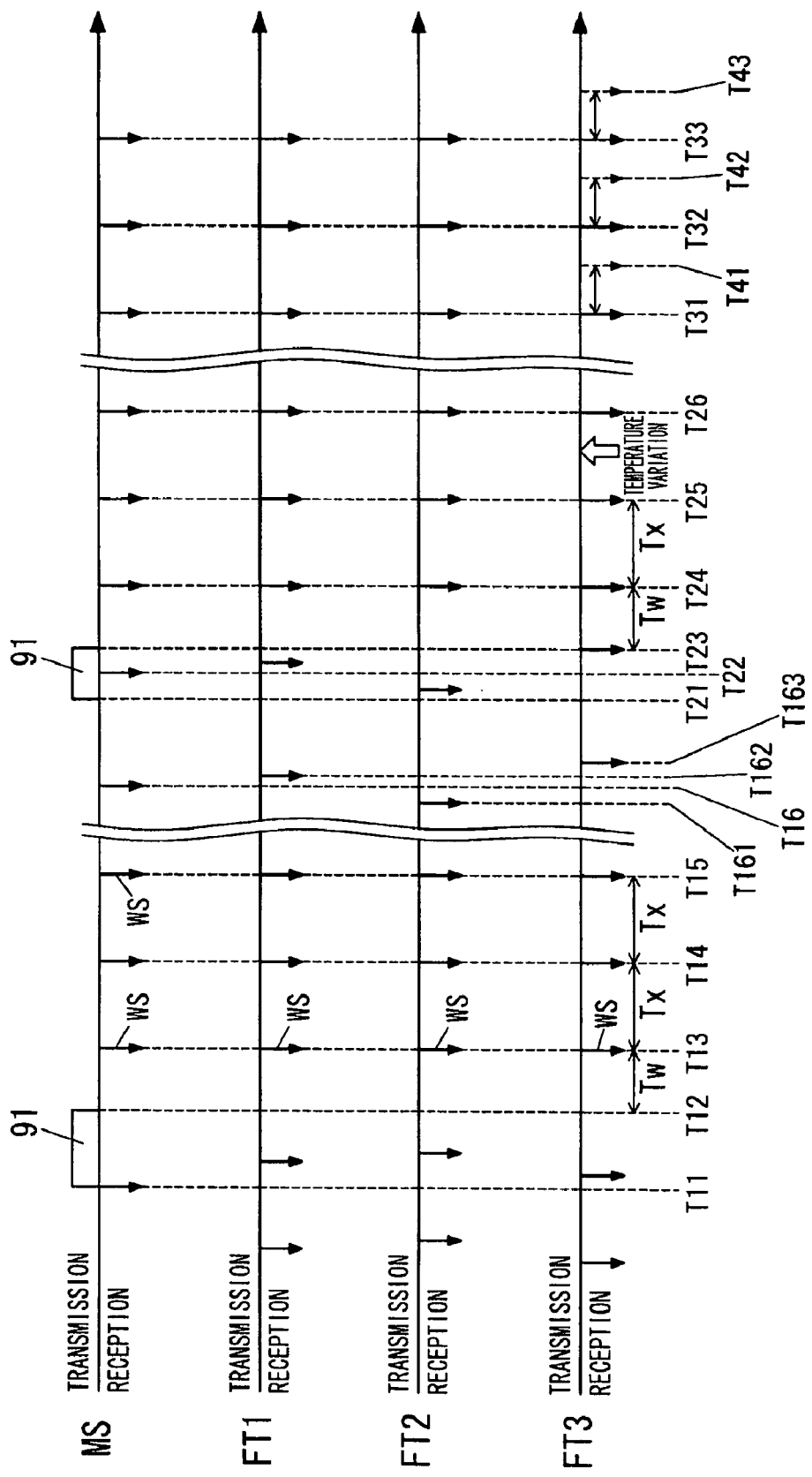
FIG. 8 is a time chart illustrating operation of the above wireless communication system.
Figure 9:
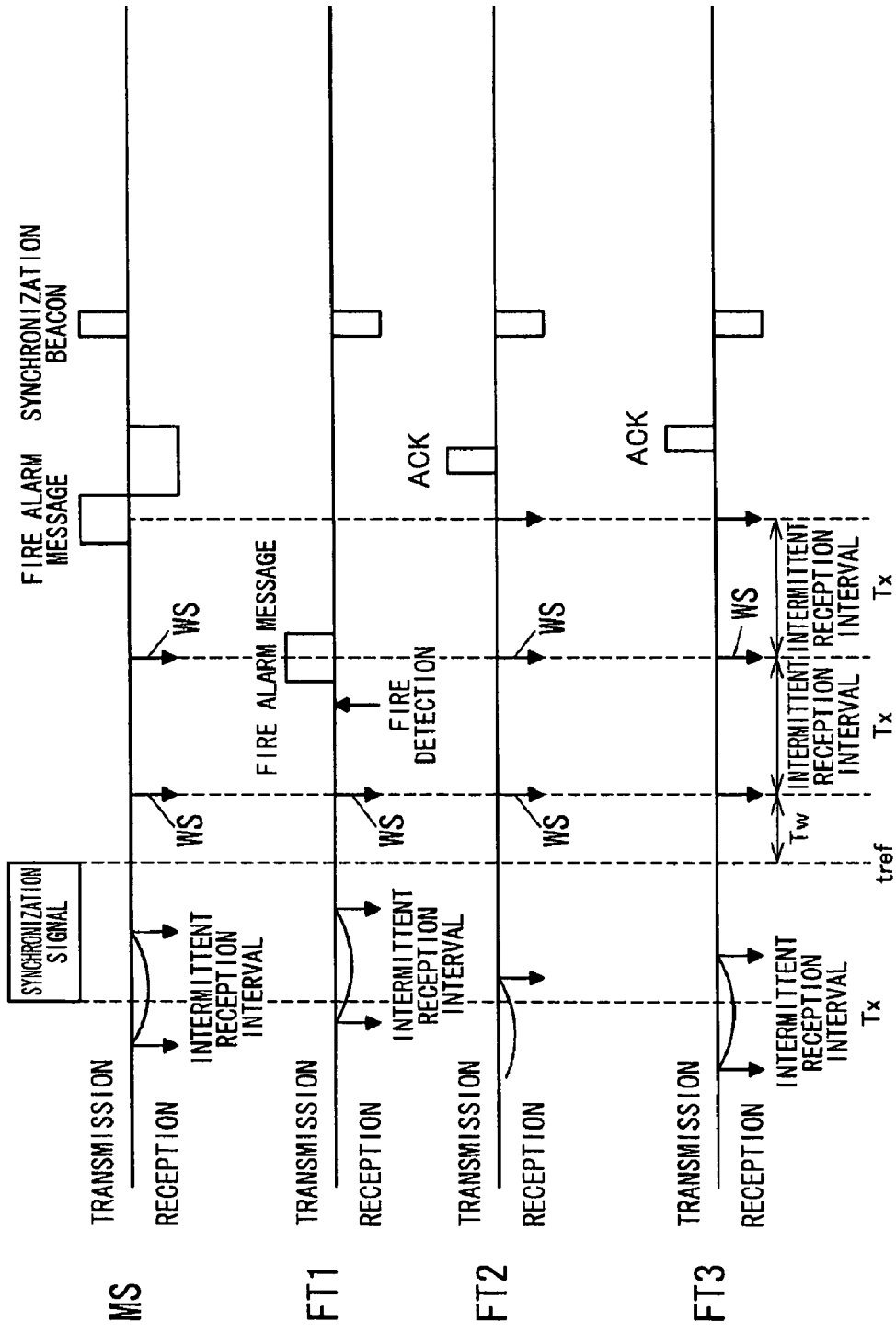
FIG. 9 is a time chart illustrating operation of the above wireless communication system.

As shown in FIG. 8, each of the wireless terminals MS, FT1 to FT3 activates its wireless receiver 123 in response to reception of an activation signal outputted from its timer 13. When the first wireless terminal MS transmits the synchronization signal 91 from a time point T11 to a time point T12, the second timer control module 152B of each of the wireless terminals FT1 to FT3 receiving the synchronization signal 91 performs the synchronization processing. Further, with regard to the first wireless terminal MS which transmitted the synchronization signal 91, the synchronization signal transmission unit 41 performs the synchronization processing.

Thus, in each of the wireless terminals MS, FT1 to FT3, the activation signal WS is outputted at a time point T13 after a lapse of the predetermined time Tw from the reference time tref. The reference time tref in FIG. 8 is the time point T12 at which transmission of the synchronization signal 91 is completed.

Consequently, the wireless terminals MS, FT1 to FT3 activate those wireless receivers 123 at a timing synchronized with each other. The wireless terminals MS, FT1 to FT3 have the same intermittent reception interval. Therefore, after the time point T12, the activation signals Ws are outputted at the same time points T13, T14, and T15. In brief, the wireless terminals have the same timing (hereinafter, referred to as "output timing") at which the timer 13 outputs the activation signal WS.

However, the individual oscillators 131 of the timers 13 see different oscillation frequency. Therefore, the output timings are likely to become deviated from each other with a lapse of time. For example, the first wireless terminal MS sees the activation signal WS output at a time point T16. The second wireless terminals FT1, FT2, and FT3 see the activation signals WS output at different time points T161, T162, and T163, respectively.

The first wireless terminal MS retransmits the synchronization signal 91 after a lapse of the predetermined time from transmission of the synchronization signal 91. In this situation, the first wireless terminal MS transmits the synchronization signal during a time period (from a time point T21 to a time point T23) including a time period (a time point T22) of receiving the activation signal WS from the timer.

The second timer control module 152B of each of the wireless terminals FT1 to FT3 receiving the synchronization signal performs the synchronization processing. Further, with regard to the first wireless terminal MS which transmitted the synchronization signal 91, the synchronization signal transmission unit 41 performs the synchronization processing.

Thus, in each of the wireless terminals MS, FT1 to FT3, the activation signal WS is outputted at a time point T24 after a lapse of the predetermined time Tw from the reference time tref (a time point T23).

As a result, the output timings of the wireless terminals MS, FT1 to FT3 becomes identical to each other again (see time points T25 and T26).

When the surrounding temperature of the second wireless terminal FT3 sees a great change, the oscillator 131 of the second wireless terminal FT3 sees a change in its oscillation frequency. Consequently, the intermittent reception interval of the second wireless terminal FT3 becomes different from the intermittent reception interval of the other wireless terminals MS, FT1, and FT2.

Therefore, the output timing of the second wireless terminal FT3 is likely to be different from the output timings of the other wireless terminals with a lapse of time (see time points T41, T42, and T43).

In view of the above, each of the wireless terminals MS, FT1 to FT3 performs regularly the second correction so as to reduce an influence caused by a change in temperature. Therefore, even if the second wireless terminal FT3 sees a large change in its surrounding temperature, the output timing of the second wireless terminal FT3 is not so greatly deviated from the output timings of the other wireless terminals MS, FT1, and FT2 (see time points T31, T32, and T33).

In the waiting condition, when the fire sensor 21 of the second wireless terminal FT1 detects a fire, the alarm generator 22 of the second wireless terminal FT1 outputs the fire alarm sound. In addition, the second wireless terminal FT1 transmits the fire notification signal (fire alarm message) during the transmission period including the time period of receiving the activation signal WS from the timer 13. As described in the above, the wireless terminals MS, FT1 to FT3 perform the intermittent reception at a timing approximately identical to each other, in the waiting condition. Consequently, each of the wireless terminals MS, FT1 to FT3 can receive the fire alarm message within the first transmission period.

In the each of the wireless terminals MS, FT2, and FT3 which received the fire alarm message, an alarm generator 22 outputs a fire alarm sound. As a result, all the wireless terminals MS, FT1 to FT3 output the fire alarm sounds. In this way, when the fire sensor 21 of any one of the wireless terminals MS, FT1 to FT3 detects a fire, the operation condition of the wireless communication system is switched from the waiting condition to the alarm cooperation condition.

In the alarm cooperation condition, when the manipulation input device 31 of the wireless terminal FT2 receives the manual input for stopping the fire alarm sound, the wireless terminal FT2 stops outputting the fire alarm sound, and transmits the alarm stop signal (alarm stop message). Upon receiving the alarm stop signal, the wireless terminal MS terminates outputting the fire alarm sound, and outputs the alarm stop signal (alarm stop message). Upon receiving the alarm stop signal, the wireless terminal FT3 stops outputting the fire alarm sound. The fire origin wireless terminal FT1 does not stop outputting the fire alarm sound even if receiving the alarm stop signal. When the manipulation input device 31 of the wireless terminal FT3 receives the manual input for stopping the fire alarm sound, the wireless communication system operates in a similar manner as mentioned above.

Besides, when the manipulation input device 31 of the wireless terminal MS receives the manual input for stopping the fire alarm sound, the wireless terminal MS terminates outputting the fire alarm sound, and transmits the alarm stop signal (alarm stop message). Upon receiving the alarm stop signal, the wireless terminals FT2 and FT3 stop outputting the fire alarm sounds. The fire origin wireless terminal FT1 does not stop outputting the fire alarm sound even if receiving the alarm stop signal. In contrast, when the manipulation input device 31 of the wireless terminal FT1 receives the manual input for stopping the fire alarm sound, the wireless terminal FT1 terminates outputting the fire alarm sound, and transmits the alarm stop signal (alarm stop message). Upon receiving the alarm stop signal, the wireless terminal MS terminates outputting the fire alarm sound, and transmits the alarm stop signal (alarm stop message). Upon receiving the alarm stop signal, the wireless terminals FT2 and FT3 stop outputting the fire alarm sounds.

The first fire alarm module 145A of the wireless terminal MS stores the fire detection conditions respectively corresponding to the wireless terminals MS, FT1 to FT3 in the first storage unit 17A. The first fire alarm module 145A updates the fire detection conditions respectively corresponding to the wireless terminals MS, FT1 to FT3, as needed.

When none of the wireless terminals MS, FT1 to FT3 detects a fire, the operation condition of the wireless communication system is switched from the fire alarm cooperation condition to the waiting condition.

When the operation condition of the wireless communication system is switched from the alarm cooperation condition to the cooperation stop condition, the first fire alarm module 145A of the wireless terminal MS starts to count a predetermined alarm stop time (e.g., 5 minutes). When the alarm stop time elapses, the first fire alarm module 145A refers to the fire detection conditions stored in the first storage unit 17A.

When none of the wireless terminals MS, FT1 to FT3 detects a fire, the first fire alarm module 145A encloses a restoration notification message in the synchronization beacon and transmits the resultant synchronization beacon. Thereby, the operation condition of the wireless communication system is switched from the cooperation stop condition to the waiting condition.

When any one of the wireless terminals MS, FT1 to FT3 detects a fire, the first fire alarm module 145A encloses the fire alarm message in the synchronization beacon and transmits the resultant synchronization beacon. Thereby, the operation condition of the wireless communication system is switched from the cooperation stop condition to the alarm cooperation condition. Alternatively, when any one of the wireless terminals MS, FT1 to FT3 detects a new fire, the wireless terminal MS transmits the fire alarm message by means of the synchronization beacon. Therefore, the operation condition of the wireless communication system is switched from the cooperation stop condition to the alarm cooperation condition.

Figure 10:
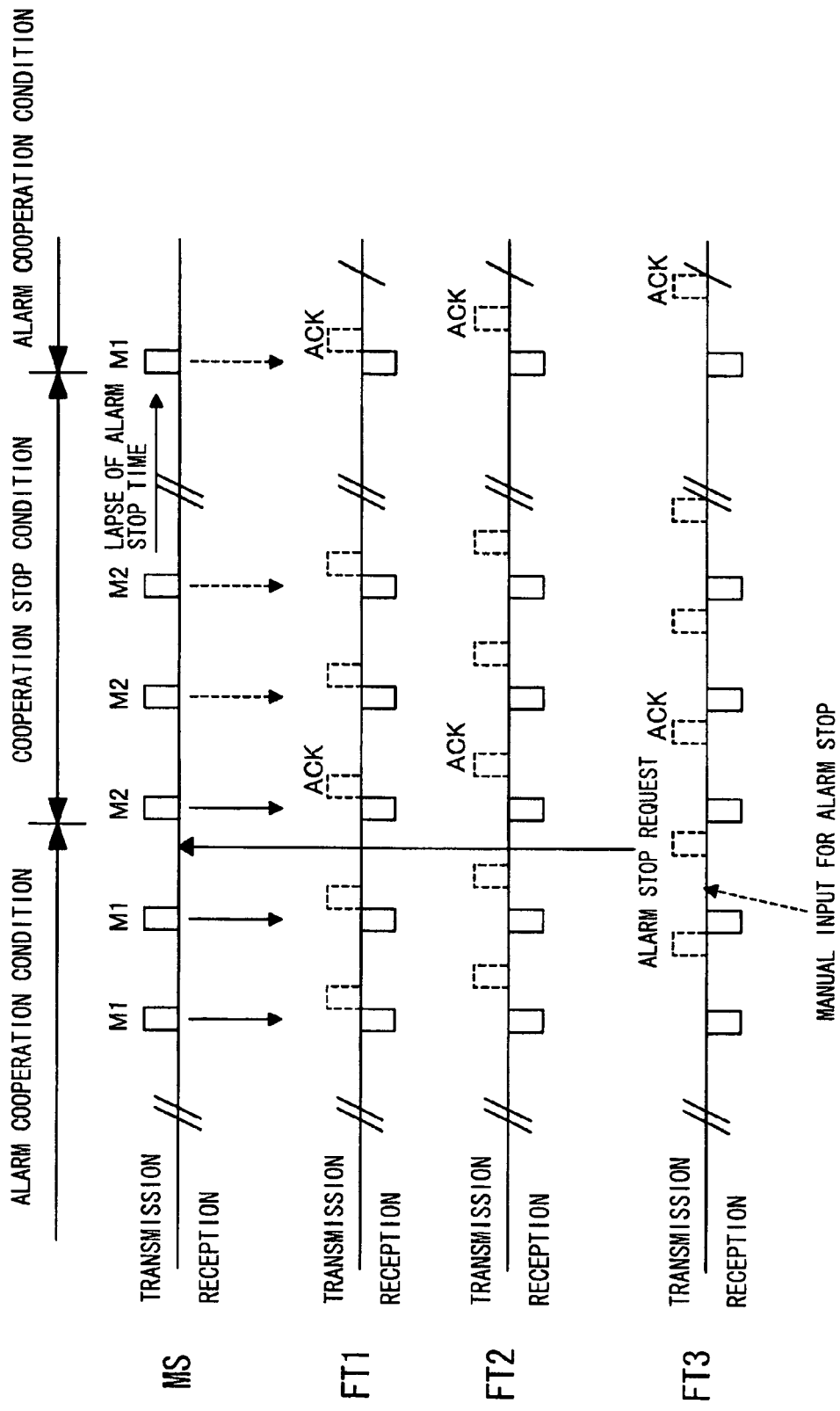
FIG. 10 is a time chart illustrating operation of the above wireless communication system.

FIG. 10 shows a time chart illustrating an instance where the first wireless terminal MS detects a fire. In the alarm cooperation condition, the first wireless terminal MS transmits the fire alarm message M1. In the alarm cooperation condition, when the second manipulation input device 31B of the wireless terminal FT3 receives the manual input for stopping the fire alarm sound, the wireless terminal FT3 stops outputting the fire alarm sound, and transmits the alarm stop message. Upon receiving the alarm stop message, the wireless terminal MS transmits the alarm stop message M2 by use of the synchronization beacon. In addition, the wireless terminal MS starts to count the alarm stop time. Upon receiving the alarm stop message M2, the second wireless terminals FT1 and FT2 stop outputting the fire alarm sounds. In contrast, the wireless terminal MS keeps outputting the fire alarm sound. Therefore, when the alarm stop time elapses, the first fire alarm module 145A refers to the fire detection conditions stored in the first storage unit 17A. Therefore, the operation condition of the wireless communication system is switched from the alarm cooperation condition to the cooperation stop condition.

When the alarm stop time elapses, the wireless terminal MS checks the fire detection conditions respectively corresponding to the wireless terminals MS, FT1 to FT3 stored in the first storage unit 17A.

According to the instance shown in FIG. 10, since the first wireless terminal MS detects the fire, the first wireless terminal MS transmits the fire alarm message M1 to the second wireless terminals FT1 to FT3 by use of the synchronization beacon.

The second wireless terminals FT1 to FT3 each of which received the fire alarm message M1 start to output the fire alarm sounds again. Therefore, the operation condition of the wireless communication system is switched from the cooperation stop condition to the alarm cooperation condition.

Figure 11:
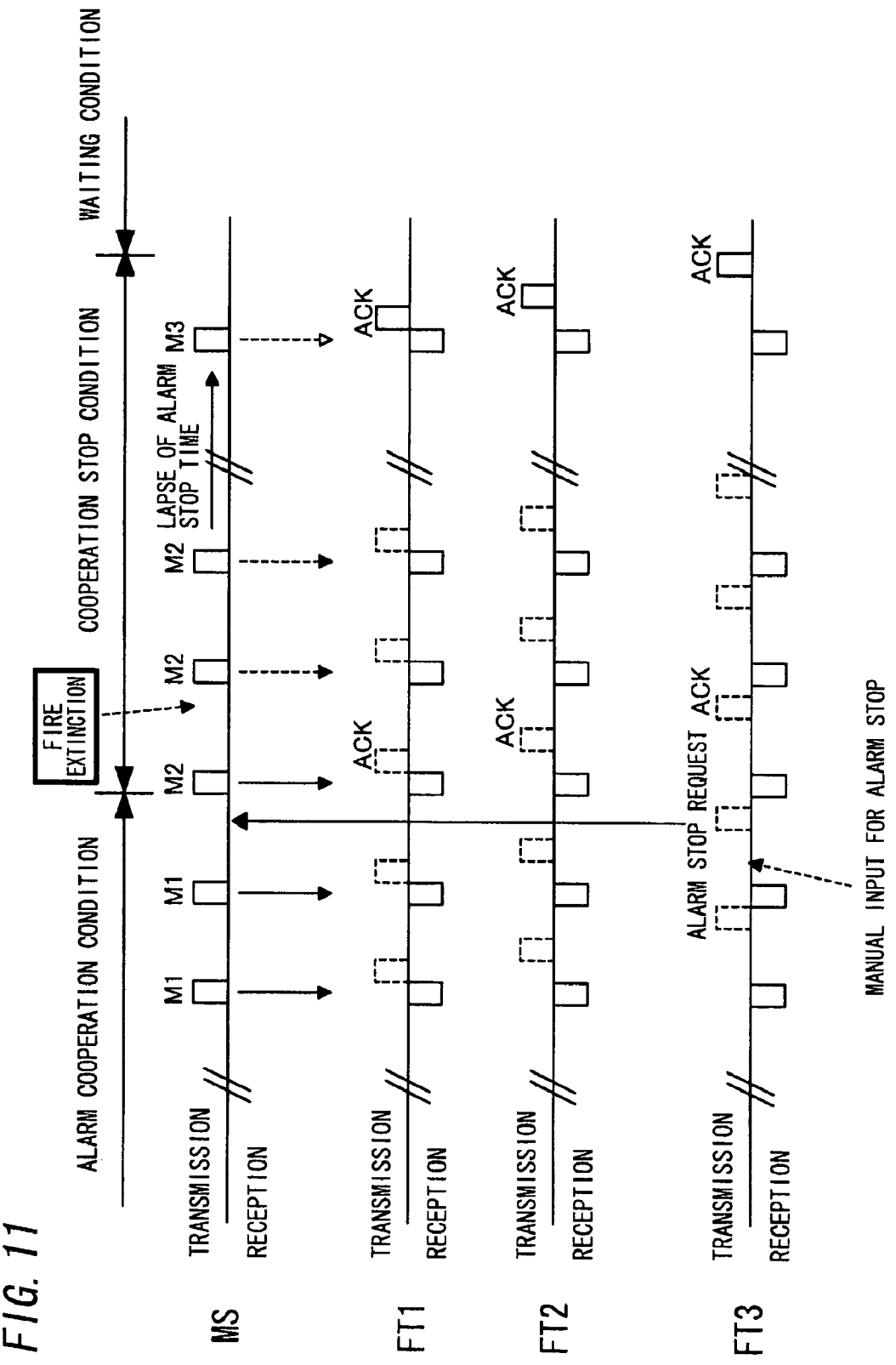
FIG. 11 is a time chart illustrating operation of the above wireless communication system.

In contrast, as shown in FIG. 11, when the fire is extinguished before a lapse of the alarm stop time, the first wireless terminal MS transmits the restoration notification message M3 to each of the second wireless terminals FT1 to FT3 by use of the synchronization beacon after the alarm stop time elapses. Upon receiving the restoration notification message M3, the second wireless terminals FT1 to FT3 stop outputting the fire alarm sounds, and transmit the acknowledgment messages ACK. Upon receiving the acknowledgment messages ACK from all the second wireless terminals FT1 to FT3, the first wireless terminal MS terminates outputting the fire alarm sound. Therefore, the operation condition of the wireless communication system is switched from the cooperation stop condition to the waiting condition.

Figure 12:
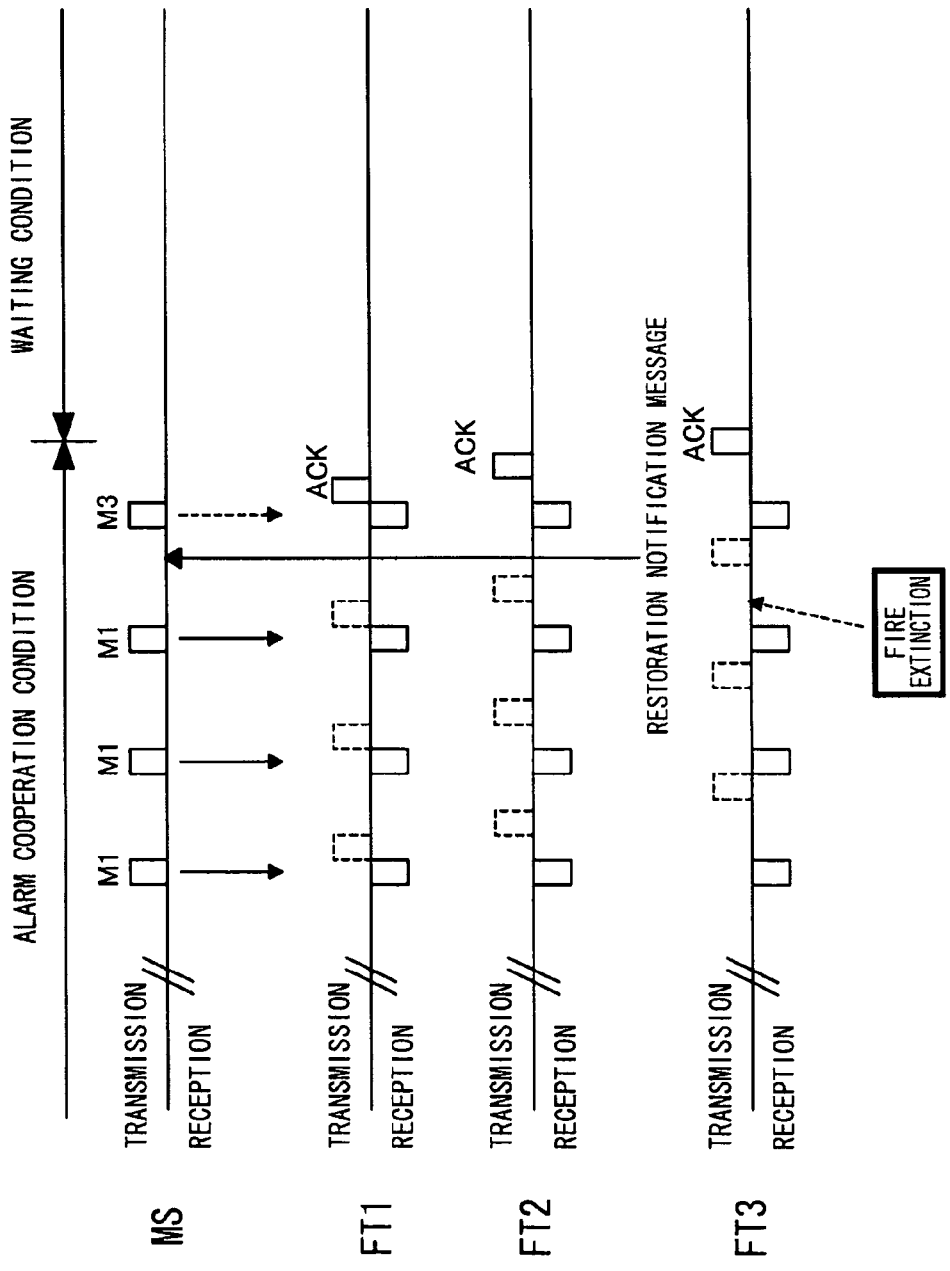
FIG. 12 is a time chart illustrating operation of the above wireless communication system.

FIG. 12 shows a time chart illustrating an instance where the second wireless terminal FT3 detects a fire. In the alarm cooperation condition, when the second wireless terminal FT3 detects no fire due to extinction of the fire, the second wireless terminal FT3 terminates outputting the fire alarm sound, and transmits the restoration notification message.

Upon receiving the restoration notification message, the first wireless terminal MS checks the fire detection conditions respectively corresponding to the wireless terminals MS, FT1 to FT3 stored in the first storage unit 17A.

When none of the wireless terminals MS, FT1 to FT3 detects a fire, the first wireless terminal MS transmits the restoration message M3 to each of the second wireless terminals FT1 to FT3 by use of the synchronization beacon. Upon receiving the restoration message M3, each of the second wireless terminals FT1 and FT2 terminates outputting a fire alarm sound. Further, each of the second wireless terminals FT1 to FT3 transmits an acknowledgement message ACK in response to reception of a restoration notification message M3. Upon receiving the acknowledgement messages ACK from all the second wireless terminals FT1 to FT3, the first wireless terminal MS stops outputting the fire alarm sound. Therefore, the operation condition of the wireless communication system is switched from the cooperation stop condition to the waiting condition.

Figure 13:
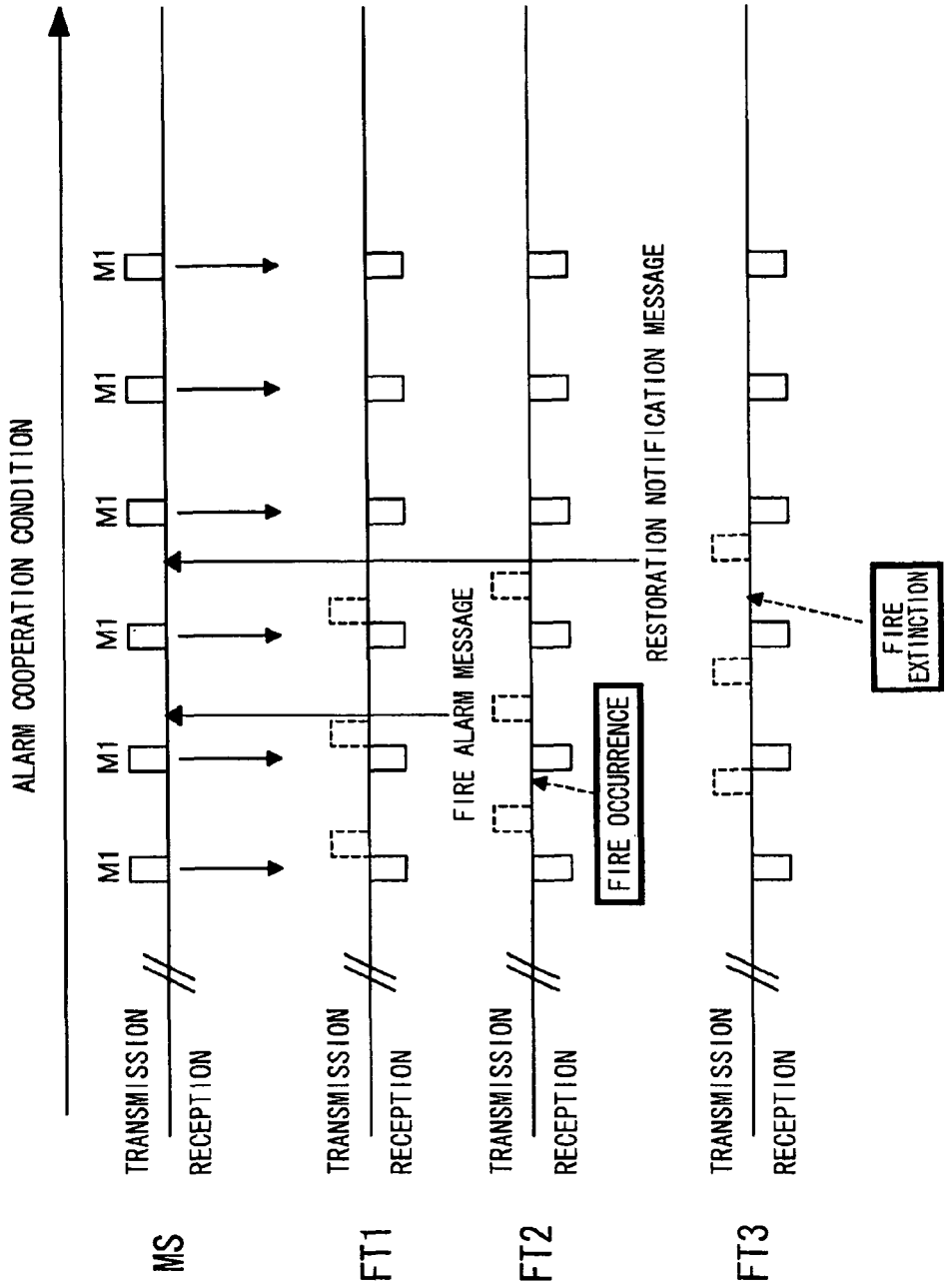
FIG. 13 is a time chart illustrating operation of the above wireless communication system.

FIG. 13 shows a time chart illustrating an instance where fires occur in vicinities of the second wireless terminals FT2 and FT3. In the alarm cooperation condition, upon detecting no fire due to extinction of the fire which occurs in the vicinity of the second wireless terminal FT3, the second wireless terminal FT3 terminates outputting the fire alarm sound, and transmits the restoration notification message.

Upon receiving the restoration notification message, the first wireless terminal MS checks the fire detection conditions respectively corresponding to the wireless terminals MS, FT1 to FT3 stored in the first storage unit 17A.

In this situation, the fire which occurs in the vicinity of the second wireless terminal FT2 remains, and the second wireless terminal FT2 still detects the fire. Therefore, the first wireless terminal MS transmits the fire alarm message to each of the second wireless terminals FT1 to FT3 by use of the synchronization beacon. Upon receiving the fire alarm message, the second wireless terminal FT3 outputs the fire alarm sound again. Thereby, the alarm cooperation condition is maintained.

As described in the above, the wireless communication system includes the plurality of the wireless terminals 10 (second wireless terminals 10B), and the synchronization device (the first wireless terminal 10A).

The synchronization device (first wireless terminal 10A) is configured to transmit, to the plurality of the wireless terminals 10B, the synchronization signal 91 defined as a wireless signal announcing the reference time. The synchronization signal 91 comprises a plurality of the reference signals 910 which are arranged in the time axis. Each of the reference signals 910 includes a reference data indicative of a relation between the corresponding reference signal and the reference time.

Each of the wireless terminals 10 (second wireless terminals 10B) includes a synchronization unit 15. The synchronization unit 15 includes the reference time calculation module 151 and the timer control module 152. The reference time calculation module 151 is configured to refer to the reference data obtained from the earliest reference signal 910 defined as a reference signal 910 which the wireless receiver 123 receives primarily and the reception time at which the wireless receiver 123 receives the earliest reference signal 910, when the wireless receiver 123 receives the synchronization signal after completion of the synchronization processing, and determine the reference time. The timer control module 152 is configured to perform the synchronization processing of controlling the timer 13 such that the activation signal is outputted after the predetermined time elapses from the reference time calculated by the reference time calculation module 151.

Each of the wireless terminals 10 is provided with its transmission control module 143 which is configured to control its wireless transmitter 123 to transmit an event notification signal during a transmission period including a time period of receiving an activation signal from its timer 13.

As described in the above, according to the wireless communication system, unless event occurs, each of the wireless terminals 10 activates its wireless receiver 123 intermittently. Since each of the wireless terminals 10 receives the synchronization signal, timings at which the reception control modules 142 of the wireless terminals 10 activate the wireless receivers 123 are coincident to each other When the event (e.g., a fire) occurs, the transmission control module 143 of the wireless terminal 10 controls its wireless transmitter 122 to transmit a wireless signal at a timing synchronized with a timing at which the other wireless terminal 10 activates its wireless receiver 123.

According to the wireless communication system of the present embodiment, a wireless signal transmitted from one of the wireless terminals 10 can be received by all the other wireless terminals 10 at the approximately same time, although the wireless receivers 123 are intermittently activated. Therefore, it is possible to reduce power consumption, and therefore give a prolonged battery operation life. Further, it is possible to decrease a time necessitated for reception of a wireless signal transmitted from one of the wireless terminals 10 by all the other wireless terminals 10.

Besides, the synchronization signal may be a multicast wireless signal which is transmitted from any one of the wireless terminals 10 to the other wireless terminals 10 by using a multicast communication. For example, the multicast wireless signal may be a wireless signal including a message announcing occurrence of malfunction (e.g., run-out of a battery). Alternatively, the aforementioned event notification signal may be adopted as the synchronization signal.

In the wireless communication system of the present embodiment, the timer 13 outputs the activation signal at the first interval (first intermittent reception interval) before completion of the synchronization processing, and outputs the activation signal at the second interval (second intermittent reception interval) greater than the first interval after completion of the synchronization processing. Therefore, after completion of the synchronization processing, it is possible to more reduce power consumption. Besides, the timer 13 may see the same intermittent reception interval both before and after completion of the synchronization processing.

In the wireless communication system of the present embodiment, at least one of the plural wireless terminals 10 (the first wireless terminal 10A, in the present embodiment) includes the synchronization signal transmission unit 14 which defines the synchronization device.

According to the wireless communication system of the present embodiment, a particular wireless terminal (first wireless terminal 10A) transmits the synchronization signal. Therefore, the wireless communication system of the present embodiment does not need a dedicated transmitter or the like so as to transmit the synchronization signal. Thus, it is possible to simplify the configuration of the wireless communication system.

Besides, the plural wireless terminals 10 may be configured to transmit the synchronization signal in a predetermined order. For example, all the wireless terminals 10 transmit the synchronization signal in sequence every time a predetermined time (e.g., 24 hours) elapses. With this arrangement, each of the second wireless terminals 10B is provided with a synchronization signal transmission unit 41.

Further, the synchronization signal transmission unit 41 is configured to transmit the synchronization signal including an identification sign designating the wireless terminal 10 which transmits the synchronization signal next. The synchronization signal transmission unit 41 is configured to transmit the synchronization signal after a lapse of a predetermined time, when the wireless receiver 123 receives the synchronization signal which includes an identification sign of a wireless terminal 10 that is coincident with the identification sign of the wireless terminal 10 to which the same synchronization signal transmission unit 41 belongs.

With this modification, it is possible to prevent a battery of the particular wireless terminal 10 from running out earlier than batteries of the other wireless terminals 10.

In the wireless communication system of the present embodiment, the first wireless terminal 10A includes the synchronization signal transmission unit 41 defining the synchronization device. In addition, the first wireless terminal 10A includes the judgment unit 51. Each of the second wireless terminals 10B includes a notification unit 61. The synchronization signal transmission unit 41 is configured to control the wireless transmitter 122 to transmit the synchronization signal each time it receives the activation signal from the timer 13 by a predetermined number of times. The notification unit 61 is configured to, when the wireless receiver 123 receives the synchronization signal, control the wireless transmitter 122 to transmit the notification signal. The judgment unit 51 is configured to judge whether or not the second wireless terminal has a malfunction, on the basis of whether or not the wireless receiver 123 receives the notification signal before a lapse of the predetermined time from transmission of the synchronization signal by the synchronization signal transmission unit 41.

According to the wireless communication system of the present embodiment, it is possible to perform a life and death check for each wireless terminal 10 by use of the synchronization signal. In brief, a wireless signal transmitted for performing the life and death check is adopted as the synchronization signal.

Besides, the first wireless terminal 10A may include a periodically monitoring unit (not shown). The periodically monitoring unit is configured to activate the wireless transmitter 122 at a regular interval (e.g., 24 hours), and controls the same to transmit a wireless signal (periodically monitoring signal) including a periodically monitoring message for execution of a check (periodic monitoring) of whether or not the second wireless terminal 10B operates normally. With this arrangement, the notification unit 61 of the second wireless terminal 10B is configured to control the wireless receiver 123 to transmit the notification signal when the wireless receiver 123 receives the periodically monitoring signal.

In the wireless communication system of the present embodiment, one of the plural wireless terminals 10 is used as the synchronization device. Alternatively, the synchronization device may be a dedicated transmission terminal (not shown) configured to transmit the synchronization signal. With use of the dedicated transmission terminal, it is possible to save the batteries of the wireless terminals 10.

However, the individual oscillators 131 of the timers 13 of the wireless terminals 10 see different frequency stability (frequency deviation). Therefore, it is difficult to output the activation signals at the same intermittent reception interval in a strict sense. The timers 13 output individual activation signals at the timings which become deviated from each other with a lapse of time from the synchronization processing. For example, when the frequency deviation is ±50 ppm, and when the synchronization signal has a signal width (time width) of 2.8 sec, synchronization loss will occur after a lapse of approximately 7.8 hours.

In brief, synchronization loss will occur due to time deviation (frequency deviation of the oscillator 131) of the timer 13 which counts the intermittent reception interval.

In view of the above insufficiency, in the wireless communication system of the present embodiment, the synchronization unit 15 includes the reference time difference calculation module 153, and the correction module 154. The reference time difference calculation module 153 is configured to refer to the reference data obtained from the earliest reference signal 910 when the wireless receiver 123 receives the synchronization signal after completion of the synchronization processing, and determine the time difference $\Delta T$ between the reference time tref and the reception time t regarding the earliest reference signal 910. The correction module 154 is configured to adjust the settings of the timer 13 to reduce the time difference $\Delta T$ determined by the reference time difference calculation module 153.

Therefore, according to the wireless communication system of the present embodiment, it is possible to prevent occurrence of the synchronization loss caused by the time deviation of the timer 13 which counts the intermittent reception interval.

The oscillator 131 of the timer 13 has temperature characteristics (frequency-temperature characteristics) of decreasing the oscillation frequency with an increase in temperature difference between the surrounding temperature of the oscillator 131 and the reference temperature (e.g., 25° C.), as shown in FIG. 7. Therefore, the oscillator 131 of one wireless terminal 10 which is influenced by climate change, an conditioned air in a room, or the like may have its oscillation frequency different from the oscillation frequencies of the oscillators 131 of the other wireless terminals 10. In this situation, the activation timing of the wireless receiver of one wireless terminal is likely to be deviated from those of the other wireless terminals 10, and therefore synchronization loss will occur.

In view of the above insufficiency, in the wireless communication system of the present embodiment, each of the wireless terminals 10 includes a temperature sensor 16 configured to measure a surrounding temperature thereof. The timer 13 includes the oscillator 131 configured to output the clock pulse at the constant interval, and the clock circuit 132 configured to measure the predetermined interval by use of the clock pulse obtained from the oscillator 131 and output the activation signal. The synchronization unit 15 includes the temperature characteristics storage module 156, the time interval difference calculation module 155, and the correction module 154. The temperature characteristics storage module 156 is configured to store the temperature characteristics of the oscillation frequency of the oscillator 131. The time interval difference calculation module 155 is configured to refer to the temperature measured by the temperature sensor 16 and the temperature characteristics stored in the temperature characteristics storage module 156, and determine the time difference between the predetermined time interval at the predetermined reference temperature and the predetermined time interval at the temperature measured by the temperature sensor 16. The correction module 154 is configured to adjust the settings of the timer 13 to reduce the time difference determined by the time interval difference calculation module 155.

Therefore, according to the wireless communication system of the present embodiment, it is possible to prevent occurrence of synchronization loss resulting from the temperature characteristics of the oscillation frequency of the timer 13.

The invention claimed is:

1. A wireless communication system comprising:
   a plurality of wireless terminals; and
   a synchronization device,
   wherein each of said wireless terminals includes a power supply unit configured to accommodate a battery, a wireless transmitter, a wireless receiver, a timer configured to output an activating signal at a predetermined interval, a control unit, and a synchronization unit,
   said control unit including an operation control module, a reception control module, and a transmission control module,
   said operation control module being configured to keep said reception control module operating and deactivate said transmission control module unless a predetermined event occurs, and to activate said transmission control module and deactivate said reception control module in response to occurrence of the event,
   said reception control module being configured to, upon receiving said activation signal from said timer, supply electrical power from said power supply unit to said wireless receiver for activation thereof, and to control the same wireless receiver in a manner to deactivate said wireless receiver unless said wireless receiver receives a predetermined wireless signal before a predetermined waiting time elapses after said wireless receiver is activated,
   said transmission control module being configured to supply electrical power from said power supply unit to said wireless transmitter for intermittent activation thereof, and to control said wireless transmitter in a manner to transmit an event notification signal defined as a wireless signal including a message corresponding to said event in a transmission period in which said wireless transmitter operates,
   said synchronization device being configured to transmit, to the plurality of said wireless terminals, a synchronization signal defined as a wireless signal announcing a reference time,
   said synchronization signal comprising a plurality of reference signals which are arranged in a time axis,
   each of said reference signals including a reference data indicative of a relation between the corresponding reference signal and said reference time,
   said synchronization unit including a reference time calculation module, and a timer control module,
   said reference time calculation module being configured to refer to said reference data obtained from an earliest reference signal defined as said reference signal which said wireless receiver receives primarily and a reception time at which said wireless receiver receives said earliest reference signal, when said wireless receiver receives said synchronization signal, and determine the reference time,
   said timer control module being configured to perform a synchronization processing of controlling said timer such that said activation signal is output after a predetermined time elapses from said reference time calculated by said reference time calculation module, and
   said transmission control module being configured to control said wireless transmitter to transmit said event notification signal during said transmission period including a time period of receiving said activation signal from said timer.

2. The wireless communication system as set forth in claim 1, wherein
   said synchronization unit includes a reference time difference calculation module, and a correction module,
   said reference time difference calculation module being configured to refer to said reference data obtained from said earliest reference signal when said wireless receiver receives said synchronization signal after completion of said synchronization processing, and determine a time difference between said reference time and said reception time regarding said earliest reference signal, and
   said correction module being configured to adjust a setting of said timer to reduce said time difference determined by said reference time difference calculation module.

3. The wireless communication system as set forth in claim 1, wherein
   each of said wireless terminals includes a temperature sensor configured to measure a surrounding temperature thereof,
   said timer including an oscillator configured to output a clock pulse at a constant interval, and a clock circuit configured to measure said predetermined interval by use of said clock pulse obtained from said oscillator and output said activation signal,
   said synchronization unit including a temperature characteristics storage module, a time interval difference calculation module, and a correction module,
   said temperature characteristics storage module being configured to store temperature characteristics of an oscillation frequency of said oscillator,
   said time interval difference calculation module being configured to refer to the temperature measured by said temperature sensor and said temperature characteristics stored in said temperature characteristics storage module, and determine a time difference between said predetermined time interval at a predetermined reference temperature and said predetermined time interval at the temperature measured by said temperature sensor, and
   said correction module being configured to adjust a setting of said timer to reduce said time difference determined by said time interval difference calculation module.

4. The wireless communication system as set forth in claim 1, wherein
   said timer has a first time interval, and a second timer interval greater than said first time interval, and is configured to output said activation signal at said first interval before completion of said synchronization processing, and to output said activation signal at said second interval after completion of said synchronization processing.

5. The wireless communication system as set forth in claim 1, wherein
   at least one of the plurality of said wireless terminal includes a synchronization signal transmission unit defining said synchronization device,
   said synchronization signal transmission unit being configured to control said wireless transmitter to transmit said synchronization signal each time it receives said activation signal from said timer by a predetermined number of times.

6. The wireless communication system as set forth in claim 1, wherein
   the plurality of said wireless terminals includes a first wireless terminal having a judgment unit and a second wireless terminal having a notification unit, said first wireless terminal including a synchronization signal transmission unit defining said synchronization device, said synchronization signal transmission unit being configured to control said wireless transmitter to transmit said synchronization signal each time it receives said activation signal from said timer by a predetermined number of times, said notification unit being configured to, when said wireless receiver receives said synchronization signal, control said wireless transmitter to transmit a notification signal defined as a wireless signal including a notification message, and said judgment unit being configured to judge whether or not said second wireless terminal has a malfunction, on the basis of whether or not said wireless receiver receives said notification signal before a lapse of a predetermined time from transmission of said synchronization signal by said synchronization signal transmission unit.

7. The wireless communication system as set forth in claim 2, wherein said synchronization signal includes a plurality of frames each of which defines said reference signal, each of said frames including a unique word used for synchronizing frames, and said reference data, said reference data being defined as a data indicative of a frame number exclusively assigned to said frame, and said reference time difference calculation module being configured to refer to the frame number of said frame corresponding to said earliest reference signal, and determine said time difference between said reference time and said reception time regarding said earliest reference signal.

8. The wireless communication system as set forth in claim 2, wherein said correction module is configured to adjust the settings of said timer when said time difference obtained from said reference time difference calculation module exceeds a minimum value of said time difference that can be varied by said timer.

9. The wireless communication system as set forth in claim 1, wherein each of said wireless terminals includes a fire sensor configured to detect a fire, and an alarm generator configured to output an alarm sound, said control unit including a fire alert module configured to said alarm generator, said operation control module being configured to, when said fire sensor detects a fire, activate said transmission control module and deactivate said reception control module, said transmission control module being configured to, when said fire sensor detects a fire, control said wireless transmitter to transmit a fire notification signal defined as a wireless signal including a fire alarm message while said wireless transmitter operates, and said fire alarm module being configured to, when said fire sensor detects a fire or when said wireless receiver receives said fire notification signal, control said alarm generator to output the alarm sound.

* * * * *